(12) United States Patent
Conant et al.

(10) Patent No.: US 9,942,756 B2
(45) Date of Patent: Apr. 10, 2018

(54) SECURING CREDENTIAL DISTRIBUTION

(71) Applicant: Cirrent, Inc., San Mateo, CA (US)

(72) Inventors: Robert A. Conant, Burlingame, CA (US); Barbara Nelson, San Mateo, CA (US)

(73) Assignee: Cirrent, Inc., San Mateo, CA (US)

( * ) Notice: Subject to any disclaimer, the term of this patent is extended or adjusted under 35 U.S.C. 154(b) by 195 days.

(21) Appl. No.: 14/939,203

(22) Filed: Nov. 12, 2015

(65) Prior Publication Data

US 2016/0066183 A1 Mar. 3, 2016

Related U.S. Application Data

(63) Continuation-in-part of application No. 14/871,525, filed on Sep. 30, 2015, which is a continuation-in-part of application No. 14/800,980, filed on Jul. 16, 2015.

(60) Provisional application No. 62/079,502, filed on Nov. 13, 2014, provisional application No. 62/079,497, filed on Nov. 13, 2014, provisional application No.
(Continued)

(51) Int. Cl.
*H04W 12/06* (2009.01)
*G06F 21/60* (2013.01)
*H04L 29/06* (2006.01)

(52) U.S. Cl.
CPC .......... *H04W 12/06* (2013.01); *G06F 21/602* (2013.01); *H04L 63/0853* (2013.01)

(58) Field of Classification Search
CPC ........ G06F 21/602; G06F 21/31; G06F 21/41; G06F 21/6209; H04W 12/02; H04W 12/04; H04W 12/06; H04W 12/08; H04W 48/02; H04W 48/18; H04W 76/02; H04L 12/2803; H04L 63/0428; H04L 63/06; H04L 63/061; H04L 63/08; H04L 63/0823; H04L 63/083; H04L 63/0853; H04L 63/0876; H04L 63/0869; H04L 63/10; H04L 63/101; H04L 67/141; H04L 9/0819; H04L 9/0822; H04L 9/0861; H04L 9/0877; H04L 9/32
See application file for complete search history.

(56) References Cited

U.S. PATENT DOCUMENTS 5,734,718 A * 3/1998 Prafullchandra ....... G06F 21/31
380/29
D397,064 S * 8/1998 Nelson .......................... D11/222
(Continued)

*Primary Examiner* — Eric Nowlin
(74) *Attorney, Agent, or Firm* — Brian R. Short

(57) ABSTRACT

Methods, systems and apparatus for securing credential distribution are disclosed. One method includes receiving notification from a credential management system that a wireless device is associated with an authenticated user of the credential management system. The method further includes receiving the private network credentials of the authenticated user, storing the private network credentials and the identifier of the wireless device, receiving an authentication request from a router, returning a response to the authentication request to the router, wherein the response includes internet domains and connection bandwidths the wireless device is allowed to use, authenticating the wireless device, ensuring that the wireless device is authorized to receive private network credentials; and distributing, by the cloud system, the private network credentials to the wireless device, thereby allowing the wireless device to obtain local network access with the private network credentials.

17 Claims, 12 Drawing Sheets

Related U.S. Application Data

62/079,501, filed on Nov. 13, 2014, provisional application No. 62/025,750, filed on Jul. 17, 2014.

(56) References Cited

U.S. PATENT DOCUMENTS

| | | | |
|---|---|---|---|
| 6,163,794 A * | 12/2000 | Lange | H04L 63/10 709/202 |
| 6,839,733 B1 * | 1/2005 | Lange | H04L 63/10 709/202 |
| 7,117,359 B2 * | 10/2006 | Wood | G06F 21/31 713/155 |
| 7,155,305 B2 | 12/2006 | Hayes et al. | |
| 7,240,211 B2 * | 7/2007 | Hillhouse | H04L 67/1002 709/225 |
| 7,379,778 B2 | 5/2008 | Hayes et al. | |
| 7,496,953 B2 * | 2/2009 | Andreev | H04L 63/0815 726/12 |
| 7,539,862 B2 * | 5/2009 | Edgett | H04L 63/08 709/223 |
| 7,574,496 B2 * | 8/2009 | McCrory | H04L 29/06 370/231 |
| 7,949,752 B2 * | 5/2011 | Lange | H04L 63/10 709/202 |
| 7,958,352 B2 * | 6/2011 | Edgett | H04L 63/08 713/164 |
| 7,958,547 B2 * | 6/2011 | Andreev | H04L 63/0815 726/18 |
| 8,290,163 B2 * | 10/2012 | Chang | H04W 12/06 380/272 |
| 8,326,914 B2 * | 12/2012 | Lange | H04L 63/10 709/202 |
| 8,502,996 B2 * | 8/2013 | St. Jacques, Jr. | G06F 3/1203 358/1.1 |
| 8,539,247 B2 * | 9/2013 | McGrew | G06F 21/46 713/182 |
| 8,584,221 B2 * | 11/2013 | Mazur | H04L 63/0846 726/8 |
| 8,607,330 B2 * | 12/2013 | Childress | G06F 21/31 726/18 |
| 8,689,297 B2 * | 4/2014 | Pasquero | G06F 21/34 726/6 |
| 8,743,778 B2 * | 6/2014 | Gordon | H04L 63/06 370/328 |
| 8,769,642 B1 * | 7/2014 | O'Neill | H04L 63/10 726/1 |
| 8,819,851 B1 * | 8/2014 | Johansson | H04L 63/0428 726/28 |
| 8,875,261 B2 * | 10/2014 | Delia | G06F 21/31 726/24 |
| 8,909,928 B2 * | 12/2014 | Ahmad | G06F 21/57 713/168 |
| 8,955,080 B2 * | 2/2015 | Brunswig | G06F 21/41 713/158 |
| 8,955,082 B2 * | 2/2015 | Mazur | H04L 63/0846 726/8 |
| 8,984,589 B2 * | 3/2015 | Liu | H04L 63/08 726/28 |
| 9,009,815 B2 * | 4/2015 | Pieczul | G06F 21/46 726/18 |
| 9,043,458 B2 * | 5/2015 | Balaji | H04L 43/04 709/217 |
| 9,053,310 B2 * | 6/2015 | Oberheide | G06F 21/32 |
| 9,064,278 B2 * | 6/2015 | Fan | G06Q 10/101 |
| 9,077,703 B1 * | 7/2015 | Goshen | H04L 63/08 |
| 9,088,556 B2 * | 7/2015 | Truskovsky | H04L 63/08 |
| 9,088,627 B2 * | 7/2015 | Nelson | H04L 63/0823 |
| 9,118,662 B2 * | 8/2015 | Corrion | H04L 63/0838 |
| 9,167,053 B2 * | 10/2015 | Marmolejo-Meillon | H04L 63/0823 |
| 9,191,874 B2 * | 11/2015 | Marmolejo-Meillon | H04W 4/00 |
| 9,231,981 B2 * | 1/2016 | Delia | G06F 21/31 |
| 9,256,722 B2 * | 2/2016 | Saxman | G06F 21/33 |
| 9,270,654 B2 * | 2/2016 | Marmolejo-Meillon | H04L 41/0809 |
| 9,326,138 B2 * | 4/2016 | Wynn | H04L 63/0428 |
| 9,332,018 B2 * | 5/2016 | Liebl, III | G06F 21/31 |
| 9,332,069 B2 * | 5/2016 | Aahlad | H04L 67/1048 |
| 9,356,962 B2 * | 5/2016 | Ilieva | H04L 63/20 |
| 9,378,601 B2 | 6/2016 | Ricci | |
| 9,384,339 B2 * | 7/2016 | Griffin | H04L 63/0884 |
| 9,397,990 B1 * | 7/2016 | Taly | H04L 63/08 |
| 9,418,257 B2 | 8/2016 | Wassingbo | |
| 9,420,045 B2 * | 8/2016 | Marmolejo-Meillon | H04L 63/0823 |
| 9,451,464 B2 * | 9/2016 | Fan | H04W 12/08 |
| 9,454,656 B2 * | 9/2016 | Oberheide | G06F 21/32 |
| 9,479,503 B2 * | 10/2016 | Griffin | H04L 63/0884 |
| 9,494,694 B1 | 11/2016 | Dong et al. | |
| 9,497,187 B2 * | 11/2016 | Griffith | H04L 63/0823 |
| 9,537,857 B1 * | 1/2017 | Koved | H04L 63/083 |
| 9,563,413 B2 * | 2/2017 | Chan | G06F 9/54 |
| 9,584,507 B1 * | 2/2017 | Koved | H04L 63/083 |
| 9,602,503 B2 * | 3/2017 | Saxman | G06F 21/33 |
| 9,628,472 B1 * | 4/2017 | Koved | H04L 63/083 |
| 9,672,071 B2 * | 6/2017 | Gerganov | G06F 9/5027 |
| 9,686,682 B2 * | 6/2017 | Kim | H04W 12/06 |
| 9,705,878 B2 * | 7/2017 | Havercan | G06F 21/31 |
| 9,712,513 B2 * | 7/2017 | Trevathan | H04L 63/0807 |
| 9,713,003 B2 * | 7/2017 | Kim | H04W 12/06 |
| 9,742,750 B2 * | 8/2017 | Obasanjo | H04L 63/08 |
| 9,742,763 B2 * | 8/2017 | Neuman | H04L 63/0853 |
| 9,773,051 B2 * | 9/2017 | Smith | G06F 17/30575 |
| 2003/0101359 A1 * | 5/2003 | Aschen | G06F 21/55 726/23 |
| 2003/0105810 A1 * | 6/2003 | McCrory | H04L 29/06 709/203 |
| 2003/0191949 A1 * | 10/2003 | Odagawa | G06F 21/316 713/186 |
| 2004/0250118 A1 * | 12/2004 | Andreev | H04L 63/0815 726/8 |
| 2005/0159823 A1 | 7/2005 | Hayes et al. | |
| 2005/0226423 A1 * | 10/2005 | Li | H04L 63/062 380/278 |
| 2005/0228874 A1 * | 10/2005 | Edgett | H04L 63/08 709/220 |
| 2006/0191005 A1 * | 8/2006 | Muhamed | H04W 28/16 726/15 |
| 2006/0259183 A1 | 11/2006 | Hayes et al. | |
| 2006/0259184 A1 | 11/2006 | Hayes et al. | |
| 2007/0011066 A1 * | 1/2007 | Steeves | G06Q 40/00 705/35 |
| 2007/0174901 A1 * | 7/2007 | Chang | H04L 63/0846 726/5 |
| 2008/0159536 A1 * | 7/2008 | Chang | H04L 63/0846 380/258 |
| 2008/0271123 A1 | 10/2008 | Ollis et al. | |
| 2009/0126000 A1 * | 5/2009 | Andreev | H04L 63/0815 726/8 |
| 2009/0150525 A1 * | 6/2009 | Edgett | H04L 63/08 709/220 |
| 2010/0100948 A1 * | 4/2010 | Delia | G06F 21/31 726/6 |
| 2010/0127854 A1 | 5/2010 | Helvick et al. | |
| 2011/0029782 A1 * | 2/2011 | Havercan | G06F 21/31 713/183 |
| 2011/0040870 A1 * | 2/2011 | Wynn | H04L 63/0428 709/224 |
| 2011/0047603 A1 * | 2/2011 | Gordon | H04L 63/06 726/5 |
| 2011/0099616 A1 * | 4/2011 | Mazur | H04L 63/0846 726/7 |
| 2011/0225648 A1 * | 9/2011 | Channakeshava | G06F 21/46 726/18 |
| 2011/0265147 A1 * | 10/2011 | Liu | H04L 63/08 726/4 |
| 2011/0314294 A1 * | 12/2011 | McGrew | G06F 21/31 713/182 |

(56) References Cited

U.S. PATENT DOCUMENTS

| | | | |
|---|---|---|---|
| 2012/0060213 A1* | 3/2012 | Childress | G06F 21/31 726/18 |
| 2012/0131653 A1* | 5/2012 | Pasquero | G06F 21/34 726/6 |
| 2012/0173356 A1* | 7/2012 | Fan | G06Q 10/101 705/26.1 |
| 2012/0230305 A1 | 9/2012 | Barbu et al. | |
| 2012/0302219 A1 | 11/2012 | Vang | |
| 2013/0007520 A1 | 1/2013 | Glammarresi et al. | |
| 2013/0013767 A1* | 1/2013 | Stober | G06F 9/44505 709/224 |
| 2013/0046982 A1* | 2/2013 | Suh | G06F 9/5072 713/171 |
| 2013/0097306 A1 | 4/2013 | Dhunay | |
| 2013/0269020 A1* | 10/2013 | Griffin | H04L 63/0884 726/9 |
| 2013/0339489 A1 | 12/2013 | Katara et al. | |
| 2014/0026193 A1* | 1/2014 | Saxman | G06F 21/33 726/4 |
| 2014/0108019 A1 | 4/2014 | Ehsani et al. | |
| 2014/0137261 A1* | 5/2014 | Chen | G06F 21/105 726/26 |
| 2014/0165150 A1* | 6/2014 | Brunswig | G06F 21/41 726/4 |
| 2014/0172947 A1* | 6/2014 | Ghai | H04L 65/102 709/202 |
| 2014/0181948 A1* | 6/2014 | Mazur | H04L 63/0846 726/9 |
| 2014/0189004 A1* | 7/2014 | Aahlad | H04L 67/1048 709/204 |
| 2014/0201517 A1* | 7/2014 | Corrion | H04L 63/0838 713/155 |
| 2014/0282939 A1* | 9/2014 | Pieczul | G06F 21/46 726/6 |
| 2014/0289195 A1* | 9/2014 | Chan | G06F 9/54 707/620 |
| 2014/0289391 A1* | 9/2014 | Balaji | H04L 43/04 709/224 |
| 2014/0306833 A1 | 10/2014 | Ricci | |
| 2014/0325591 A1* | 10/2014 | Delia | G06F 21/31 726/1 |
| 2014/0337291 A1* | 11/2014 | Dorman | G06F 17/30117 707/634 |
| 2014/0337937 A1* | 11/2014 | Truskovsky | H04L 63/08 726/5 |
| 2014/0373096 A1* | 12/2014 | Obasanjo | H04L 63/08 726/4 |
| 2014/0380453 A1* | 12/2014 | Alonso Cebrian | H04L 63/0838 726/9 |
| 2015/0007273 A1* | 1/2015 | Lin | H04L 63/08 726/6 |
| 2015/0046990 A1* | 2/2015 | Oberheide | G06F 21/32 726/6 |
| 2015/0074582 A1 | 3/2015 | Shearer | |
| 2015/0074670 A1* | 3/2015 | Gerganov | G06F 9/5027 718/103 |
| 2015/0074743 A1* | 3/2015 | Ilieva | H04L 63/20 726/1 |
| 2015/0089597 A1* | 3/2015 | Srinivasan | H04L 63/08 726/4 |
| 2015/0142947 A1 | 5/2015 | Dyba et al. | |
| 2015/0143486 A1* | 5/2015 | Hartmann | H04W 12/06 726/6 |
| 2015/0237031 A1* | 8/2015 | Neuman | H04L 63/08 713/176 |
| 2015/0261782 A1* | 9/2015 | McFerrin | G06F 17/30174 707/625 |
| 2015/0288694 A1* | 10/2015 | Liebl, III | G06F 21/31 713/182 |
| 2015/0312041 A1* | 10/2015 | Choi | H04L 9/3231 713/175 |
| 2015/0317151 A1* | 11/2015 | Falcy | H04L 67/28 717/173 |
| 2015/0356328 A1 | 12/2015 | Wassingbo | |
| 2016/0021538 A1* | 1/2016 | Conant | H04W 12/06 455/411 |
| 2016/0021607 A1* | 1/2016 | Conant | H04W 28/0231 370/254 |
| 2016/0024823 A1 | 1/2016 | McAndrew | |
| 2016/0044032 A1* | 2/2016 | Kim | H04L 63/0876 726/5 |
| 2016/0063491 A1* | 3/2016 | Steeves | G06Q 40/00 705/71 |
| 2016/0066183 A1* | 3/2016 | Conant | H04L 63/0853 726/6 |
| 2016/0080343 A1* | 3/2016 | Robinton | H04W 4/008 726/4 |
| 2016/0081133 A1* | 3/2016 | Kim | H04L 63/0876 370/329 |
| 2016/0087966 A1* | 3/2016 | Saxman | G06F 21/33 726/4 |
| 2016/0088478 A1* | 3/2016 | Kim | H04L 63/0876 726/6 |
| 2016/0112434 A1 | 4/2016 | Chung et al. | |
| 2016/0173487 A1* | 6/2016 | Griffith | H04L 63/0823 713/156 |
| 2016/0212113 A1* | 7/2016 | Banerjee | H04L 63/083 |
| 2016/0212141 A1* | 7/2016 | Banerjee | H04L 63/0846 |
| 2016/0217638 A1 | 7/2016 | Child et al. | |
| 2016/0219044 A1* | 7/2016 | Karunakaran | H04L 63/102 |
| 2016/0219319 A1* | 7/2016 | Servignat | H04N 21/25841 |
| 2016/0234186 A1* | 8/2016 | Leblond | G06Q 10/06 |
| 2016/0249395 A1 | 8/2016 | Logue et al. | |
| 2016/0255080 A1* | 9/2016 | Griffin | H04L 63/0884 713/155 |
| 2016/0269398 A1* | 9/2016 | Chhabra | H04L 63/0838 |
| 2016/0277374 A1* | 9/2016 | Reid | H04L 63/061 |
| 2016/0295364 A1 | 10/2016 | Zakaria | |
| 2016/0323257 A1* | 11/2016 | Kang | H04L 63/08 |
| 2016/0337334 A1* | 11/2016 | Murr | H04W 12/06 |
| 2016/0337354 A1 | 11/2016 | Smadja | |
| 2016/0344862 A1* | 11/2016 | Tucker | H04M 1/72577 |
| 2016/0359837 A1* | 12/2016 | Krstic | H04L 63/102 |
| 2016/0359847 A1* | 12/2016 | Griffith | H04L 63/0823 |
| 2016/0359863 A1* | 12/2016 | Krstic | H04L 63/102 |
| 2016/0366233 A1* | 12/2016 | Le | H04L 67/16 |
| 2016/0381023 A1* | 12/2016 | Dulce | H04L 63/10 726/9 |
| 2017/0005820 A1* | 1/2017 | Zimmerman | H04L 67/10 |
| 2017/0026369 A1* | 1/2017 | Hao | H04L 63/0876 |
| 2017/0026380 A1* | 1/2017 | Liebl, III | G06F 21/31 |
| 2017/0026465 A1* | 1/2017 | Aahlad | H04L 67/1048 |
| 2017/0034142 A1* | 2/2017 | Camenisch | H04L 63/08 |
| 2017/0041316 A1 | 2/2017 | Setchell | |
| 2017/0048172 A1* | 2/2017 | Chavez | H04L 51/066 |
| 2017/0070504 A1* | 3/2017 | Ramachandran | H04L 63/20 |
| 2017/0085575 A1* | 3/2017 | Wynn | H04L 63/0428 |
| 2017/0093587 A1* | 3/2017 | Glisson | H04L 9/3268 |
| 2017/0094706 A1* | 3/2017 | Kim | H04W 76/023 |
| 2017/0099281 A1* | 4/2017 | Trevathan | H04L 63/0807 |
| 2017/0104738 A1* | 4/2017 | Brown | H04L 63/062 |
| 2017/0111335 A1* | 4/2017 | Hibbert | H04L 63/083 |
| 2017/0150535 A1* | 5/2017 | Wynn | H04W 76/021 |
| 2017/0169422 A1* | 6/2017 | Ye | G06Q 20/3674 |
| 2017/0171747 A1* | 6/2017 | Britt | H04W 12/04 |
| 2017/0180347 A1* | 6/2017 | Koved | H04L 63/083 |
| 2017/0180530 A1* | 6/2017 | Tucker | H04M 1/67 |
| 2017/0195331 A1* | 7/2017 | Wu | G05B 19/41885 |
| 2017/0195332 A1* | 7/2017 | Wu | G05B 19/41885 |
| 2017/0200001 A1* | 7/2017 | Bhullar | H04L 63/083 |
| 2017/0208051 A1* | 7/2017 | Havercan | G06F 21/31 |
| 2017/0213206 A1* | 7/2017 | Shearer | G06Q 20/3829 |
| 2017/0213212 A1* | 7/2017 | Dicker | G06Q 20/3829 |
| 2017/0213305 A1* | 7/2017 | Smith | G06Q 20/3829 |
| 2017/0272316 A1* | 9/2017 | Johnson | G06Q 10/103 |
| 2017/0277872 A1* | 9/2017 | Mercury | G06F 21/45 |
| 2017/0279614 A1* | 9/2017 | Mercury | H04L 9/3247 |
| 2017/0279793 A1* | 9/2017 | Trevathan | G06F 17/30917 |
| 2017/0288872 A1* | 10/2017 | Lu | H04L 9/3213 |

(56) References Cited

U.S. PATENT DOCUMENTS

| | | | |
|---|---|---|---|
| 2017/0295065 A1* | 10/2017 | Jain | H04L 41/12 |
| 2017/0324728 A1* | 11/2017 | Gilpin | H04L 63/10 |
| 2017/0337813 A1* | 11/2017 | Taylor | G08G 1/0141 |
| 2017/0339065 A1* | 11/2017 | Li | H04L 41/0893 |
| 2017/0339436 A1* | 11/2017 | Buono | H04N 21/2347 |
| 2017/0357936 A1* | 12/2017 | Byington | H04L 9/085 |
| 2017/0372091 A1* | 12/2017 | Lacey | G06F 17/30011 |

* cited by examiner

| Device | Configured Networks |
|---|---|
| #1 | Router Set A or C |
| #2 | Router Set B |
| #3 | Router Set C |

| Router Set | Approved Devices |
|---|---|
| Set A | #1 |
| Set B | #2 |
| Set C | #3 |

Table 1

| Device | Configured Networks |
|---|---|
| #1 | Router Set A or C |
| #2 | Router Set B |
| #3 | Router Set C |

| Router Set | Approved Devices |
|---|---|
| Set A | #1 |
| Set B | #2 |
| Set C | #3, *#1* |

Table 2

FIGURE 7

SECURING CREDENTIAL DISTRIBUTION

RELATED APPLICATIONS

This patent application is a continuation-in-part of U.S. patent application Ser. No. 14/871,525, filed Sep. 30, 2015 which claims priority to U.S. Provisional Patent Application No. 62/079,501, filed Nov. 13, 2014, which is a continuation-in-part of U.S. patent application Ser. No. 14/800,980, filed Jul. 16, 2015 which claims priority to U.S. Provisional Patent Application No. 62/025,750, filed Jul. 17, 2014, further this patent application claims priority to U.S. Provisional Patent Application No. 62/079,502, filed Nov. 13, 2014, further this patent application claims priority to U.S. Provisional Patent Application No. 62/079,497, filed Nov. 13, 2014, which are all incorporated herein by reference.

FIELD OF THE DESCRIBED EMBODIMENTS

The described embodiments relate generally to wireless networking. More particularly, the described embodiments relate to methods, systems and apparatuses for securing credential distribution.

BACKGROUND

Many companies are building products that benefit from a connection to a cloud service via the internet. For example, whitegoods manufacturers are connecting appliances like dishwashers and refrigerators to the internet to provide better customer service through remote access to the devices, and TV manufacturers are using internet connectivity to enable content streaming. WiFi (Wireless Fidelity) is becoming the predominant connectivity model for consumer connected products as well as many industrial and commercial connected products.

However, connecting these devices to the internet through WiFi is difficult for some consumers; sometimes consumers have trouble entering the SSID and password accurately, and in many cases the inconvenience of entering WiFi credentials and the dislike of the process prevents customers from buying connected products in first place. However, the model of WiFi requires the WiFi credentials to be put in the device in order to access the local network and the full bandwidth of the internet service. When consumers move or get a new wireless router, they are usually required to change the passwords in all of their devices—this can be time consuming and inconvenient, and result in even more expensive support calls for manufacturers and internet service providers.

It is desirable to have a system, method and apparatus for securing credential distribution.

SUMMARY

An embodiment includes a computer-implemented method for securing credential distribution. The method includes receiving notification from a credential management system that a wireless device is associated with an authenticated user of the credential management system, wherein the credential management system stores private network credentials of the authenticated user, and wherein the cloud system further receives an identifier of the wireless device with the notification. The method further includes receiving the private network credentials of the authenticated user, verifying that the authenticated user is authorized to provide credentials to the wireless device, storing the private network credentials and the identifier of the wireless device, receiving an authentication request from a router, wherein the router received the authentication request from the wireless device, wherein the authentication request was automatically requested by the wireless device, wherein the wireless device is preconfigured with device credentials, returning, by the cloud system, a response to the authentication request to the router, wherein the response includes internet domains and connection bandwidths the wireless device is allowed to use, authenticating, by the cloud system, the wireless device, ensuring that the wireless device is authorized to receive private network credentials; and distributing, by the cloud system, the private network credentials to the wireless device, thereby allowing the wireless device to obtain local network access with the private network credentials.

Another embodiment includes another method for securing credential distribution. The method includes receiving, by a cloud system, notification from a credential management system that a wireless device is associated with an authenticated user of the credential management system, wherein the credential management system stores private network credentials of the authenticated user, and wherein the cloud system further receives an identifier of the wireless device with the notification. The method further includes receiving, by the cloud system, the private network credentials of the authenticated user, verifying that the authenticated user is authorized to provide credentials to the wireless device, storing, by the cloud system, the private network credentials and the identifier of the wireless device, communicating, by the cloud system, with the wireless device through internet access provided by a public network, authenticating, by the cloud system, the wireless device, ensuring that the wireless device is authorized to receive private network credentials, and distributing, by the cloud system, the private network credentials to the wireless device, thereby allowing the wireless device to obtain local network access with the private network credentials.

An embodiment includes a cloud system. The cloud system includes at least one server, and is operative to receive notification from a credential management system that a wireless device is associated with an authenticated user of the credential management system, wherein the credential management system stores private network credentials of the authenticated user, and wherein the cloud system further receives an identifier of the wireless device with the notification. The cloud system is operative to receive the private network credentials of the authenticated user, verify that the authenticated user is authorized to provide credentials to the wireless device, store the private network credentials and the identifier of the wireless device, receive an authentication request from a router, wherein the router received the authentication request from the wireless device, wherein the authentication request was automatically requested by the wireless device, wherein the wireless device is preconfigured with device credentials, return a response to the authentication request to the router, wherein the response includes internet domains and connection bandwidths the wireless device is allowed to use, authenticate the wireless device, ensuring that the wireless device is authorized to receive private network credentials; and distribute the private network credentials to the wireless device, thereby allowing the wireless device to obtain local network access with the private network credentials.

Another embodiment includes a cloud system. The cloud system includes at least one server, and is operative to receive notification from a credential management system that a wireless device is associated with an authenticated user of the credential management system, wherein the credential management system stores private network credentials of the authenticated user, and wherein the cloud system further receives an identifier of the wireless device with the notification. The cloud system is operative to receive the private network credentials of the authenticated user, verify that the authenticated user is authorized to provide credentials to the wireless device, store the private network credentials and the identifier of the wireless device, communicate with the wireless device through internet access provided by a public network, authenticate the wireless device, ensuring that the wireless device is authorized to receive private network credentials, and distribute the private network credentials to the wireless device, thereby allowing the wireless device to obtain local network access with the private network credentials.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 7 shows tables that depict wireless device and router configurations, according to an embodiment.

DETAILED DESCRIPTION

The described embodiments include systems, methods, and apparatuses for securing credential distribution.

Configuring private network credentials into a wireless device that does not have a rich user interface can be quite difficult. Many users struggle to configure such wireless devices, and the existing solutions to deliver private network credentials to a device without a rich user interface are error-prone, and often quite insecure, exposing private network credentials over an ad-hoc Wi-Fi network between the device cloud application and the device. This embodiment uses a cloud system that the wireless device can connect to, over the public internet, to receive private network credentials. The device cloud application authorizes the credential management system to allow the cloud service to deliver private network credentials to the device. The existing solutions—which are mostly based on local communication between the user and the wireless device (typically through a smart phone) are difficult to operate, error prone, and insecure. By using the cloud system, this solution is more robust, far less error-prone and more secure.

At least some embodiments includes a connected wireless device (a wireless device that has internet connectivity), an access point or router (the device that allows joining of a network, for example a WiFi router in a home), a device cloud application (the software application, which may be owned and operated by the connected wireless device manufacturer, that connects to the device), the federated device cloud application (which may be run as a service by an operator), and the internet (providing connectivity from the access point or router to the wireless device connected application).

At least some of the described embodiments make it dramatically easier to connect internet-enabled products to wireless networks. Many of these devices (such as, Wi-Fi-enabled printers, lightbulbs, and/or kitchen appliances) do not have a rich user interface with a screen and keyboard, so it is difficult to configure these devices to connect to the wireless network. At least some of the described embodiments create a way to instantly and securely connect devices to the internet.

Figure 1:
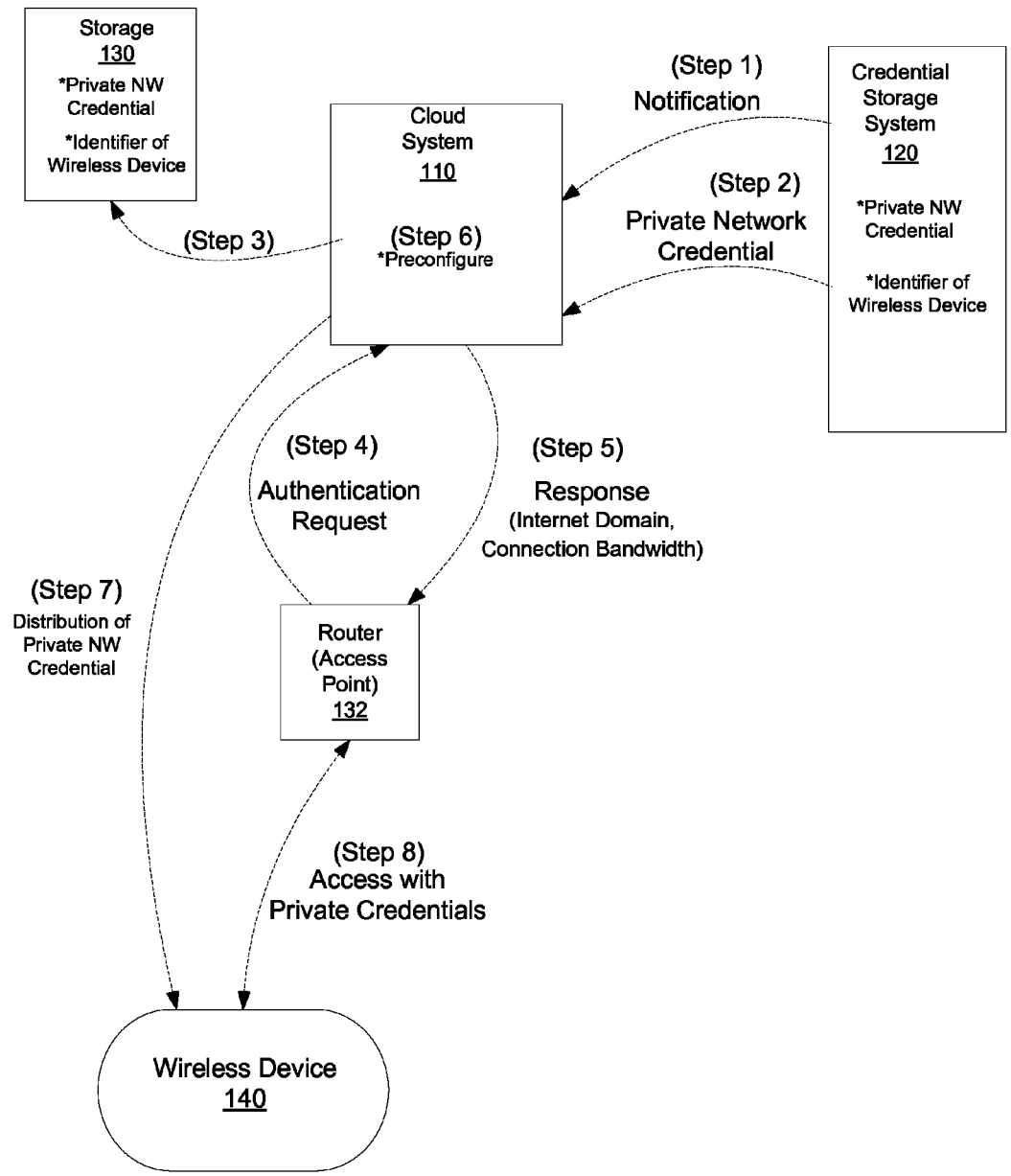
FIG. 1 shows a system for securing credential distribution, according to an embodiment.

FIG. 1 shows a system for securing credential distribution, according to an embodiment. The system includes a cloud system 110 and a credential management system 120. The system provides a wireless connection for a wireless device 140 that is designed to be connected to the internet. The wireless device 140 may connect using Wi-Fi or another communications technology. For at least some embodiments, the functionality of the wireless device 140 is enhanced by connecting to remote servers over the internet that provide a control interface for the user (for example via a smart phone), an information stream (for example a weather forecast, real-time electricity prices, or streaming video), or uploads information for analysis (for example uploading medical data from a wearable sensor).

For at least some embodiments, the cloud system 110 provides a set of services to the wireless device 140, including authentication, network management and coordination, and the secure delivery of private network credentials for use by the wireless device 140 to connect to the private network. For secure credential delivery, when the wireless device 140 authenticates to the cloud system 110, the cloud system 110 determines if there are any private network credentials in the cloud system 110 waiting to be provided to the wireless device 140. For at least some embodiments, prior to making the private network credentials available to the wireless device 140, the cloud system 110 verifies that the private network credentials were provided by an authenticated user via an authenticated credential management system 120, and the cloud system 110 also verifies that the authenticated user is authorized to provide private network credentials to the wireless device 140. For at least some embodiments, when the wireless device 140 requests private network credentials, the cloud system 110 provides the private network credentials to the wireless device 140. For at least some embodiments, the wireless device 140 attempts to connect to the private network, and then report its connection status back to the cloud system 110.

For at least one embodiment, the cloud system 110 is preconfigured with credentials for the wireless device 140. When the wireless device 140 authenticates to the cloud system 110, the cloud system 110 generates the latest network configuration for the wireless device 140 (prioritized list of networks that the wireless device is authorized to join, and associated authentication information). The wireless device 140 also reports its connection status (which network it was able to join) so that the cloud system 110 can provide confirmation to the credential management system 120 that the credentials that the credential management system 120 delivered to the cloud system 110 were valid. The wireless device 140 may also deliver product and analytic information to the cloud system 110.

For at least one embodiment, the cloud system 110 encrypts the private network credentials with an encryption key specific to the wireless device 140 and stores the encrypted private network credentials in the cloud storage 130.

For at least some embodiments, the credential management system 120 provides secure storage for private network credentials on behalf of authenticated users. Authenticated users authenticate to the credential management system, and provide private network credentials that may be delivered to authenticated wireless devices, via the cloud system. The credential management system may also keep track of which authorized wireless devices have received the credentials, so that they can be notified in case the end user provides updated private network credentials.

For an exemplary embodiment, securing credential distribution begins (designated as step 1) with the cloud system 110 authenticating a credential management system 120, and receiving notification from a credential management system 120 that a wireless device 140 is associated with an authenticated user of the credential management system 120. For at least some embodiments, the credential management system 120 stores private network credentials of the authenticated user. Further, for at least some embodiments, the cloud system 110 further receives an identifier of the wireless device 140 with the notification. For at least some embodiments, the cloud system 110 also validates that the authenticated user is authorized to deliver private network credentials to the wireless device 140.

For at least some embodiments, the notification from the credential management system 120 is via an authenticated REST (Representational State Transfer) API call from the credential management system 120 to the cloud system 110, over HTTPS. For at least some embodiments, the message format is JSON (JavaScript Object Notation). For at least some embodiments, the cloud system 110 authenticates the credential management system 120 before accepting private network credentials from the credential management system 120. In other embodiments, the notification may be via any cloud-to-cloud secure communication channel, such as SOAP (Simple Object Access Protocol) over HTTPS.

For at least some embodiments, the authenticated user is the owner of the wireless device 140, and is using a credential management system 120 provided by the product company that manufactured the wireless device 140. One such example is an authenticated user who purchases a Wi-Fi enabled camera (the wireless device). The camera manufacturer provides a cloud-based service for interacting with the camera, including such capabilities as a remote video feed. The camera manufacturer also provides a cloud-based service to store private network credentials for the camera, on behalf of the authenticated user. The authenticated user may use an application or a web interface, also provided by the camera manufacturer to deliver private network credentials to the camera manufacturer's credential management system.

For at least some embodiments, the cloud system 110 verifies that the authenticated user is authorized to provide private network credentials for the wireless device 140, by verifying that the authenticated user is in the same geographic location as the wireless device 140. In another embodiment, the cloud system 110 verifies that the authenticated user is authorized to provide private network credentials to the wireless device 140, by requiring that the authenticated user provide some device-specific information (such as a QR code or a unique identifier read from the wireless device 140) to the cloud system 110 as proof that the authenticated user is nearby the wireless device 140.

Figure 9:
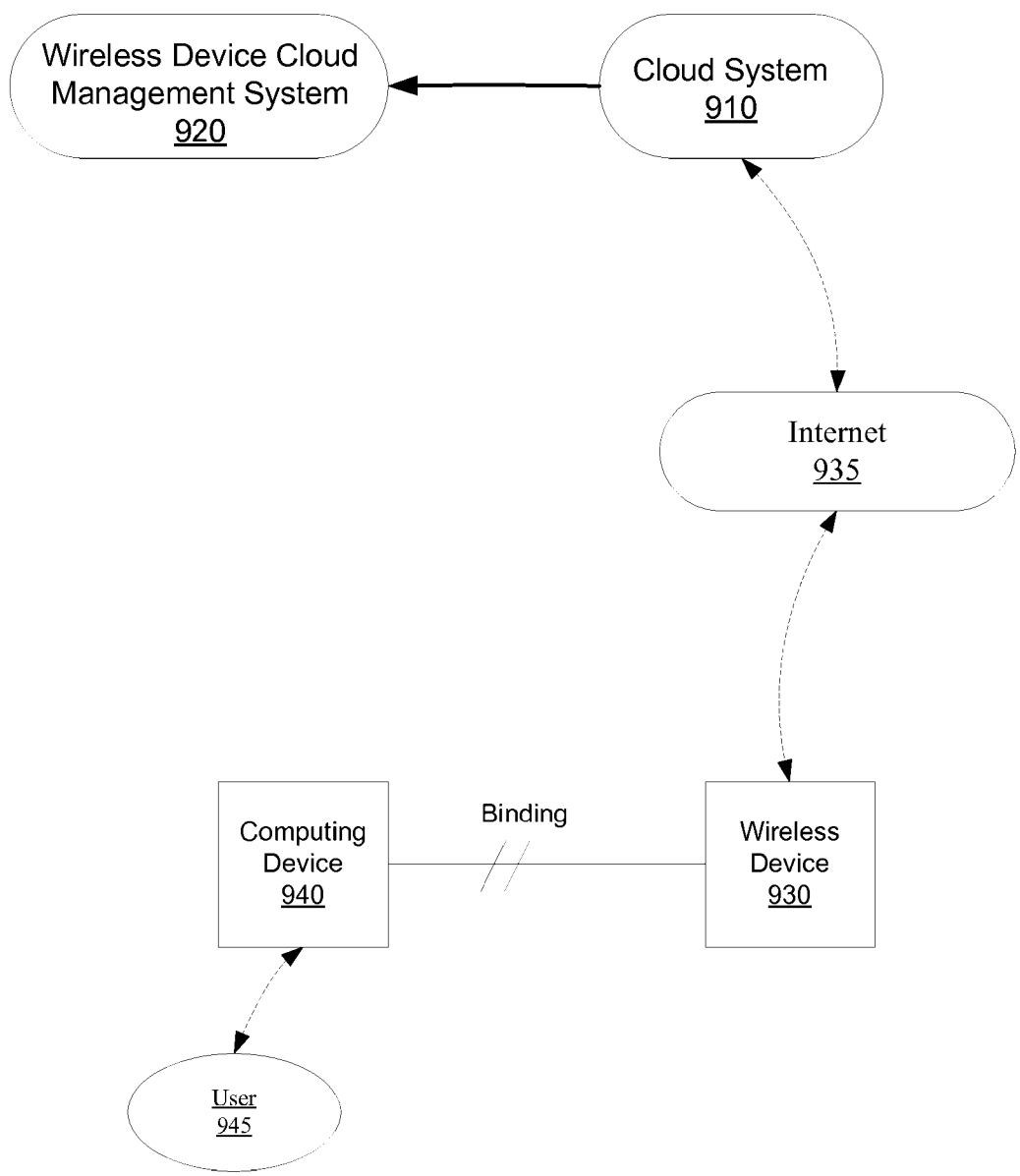
FIG. 9 shows a system for binding a computing device with a wireless device, according to an embodiment.
Figure 10:
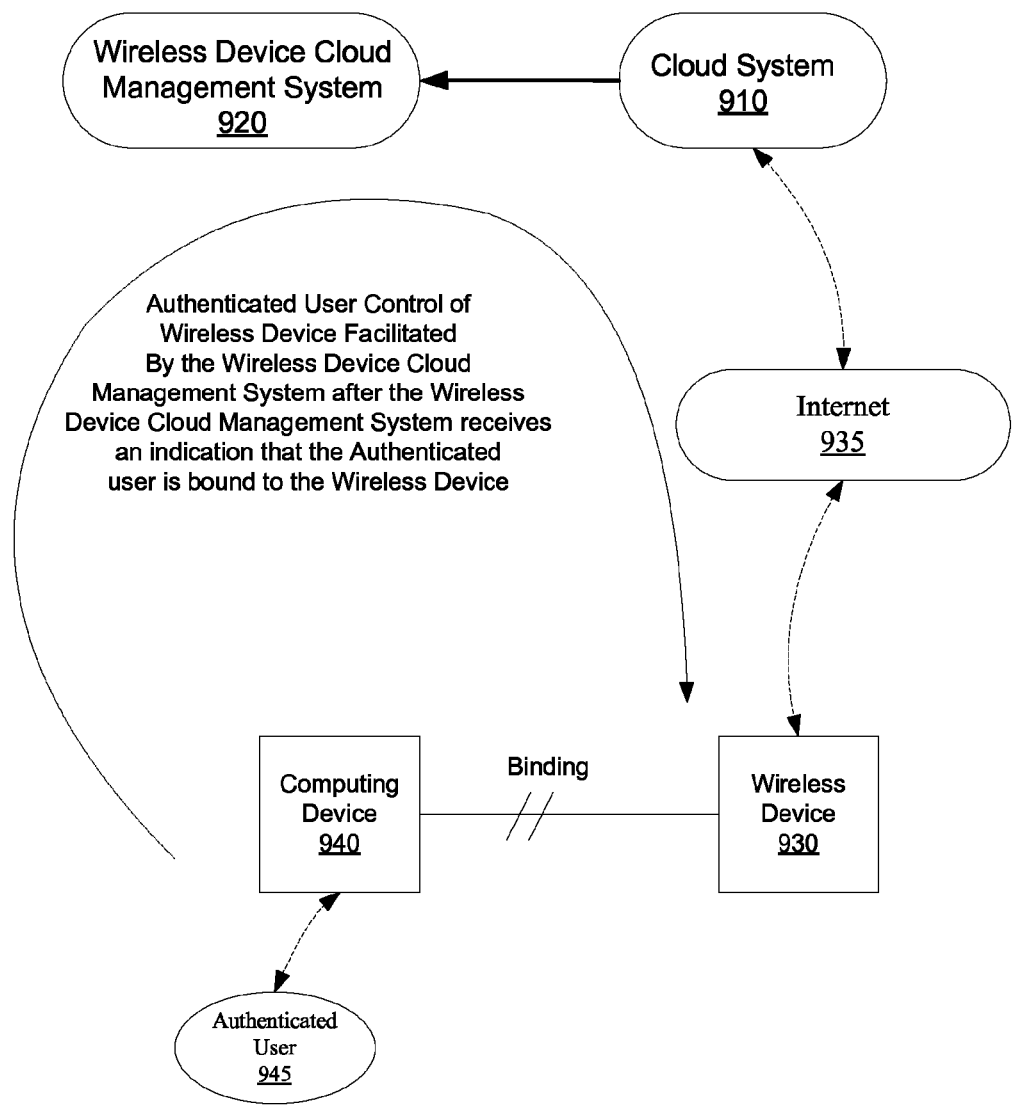
FIG. 10 shows another system for binding an authenticated user of the computing device with the wireless device, according to an embodiment.
Figure 11:
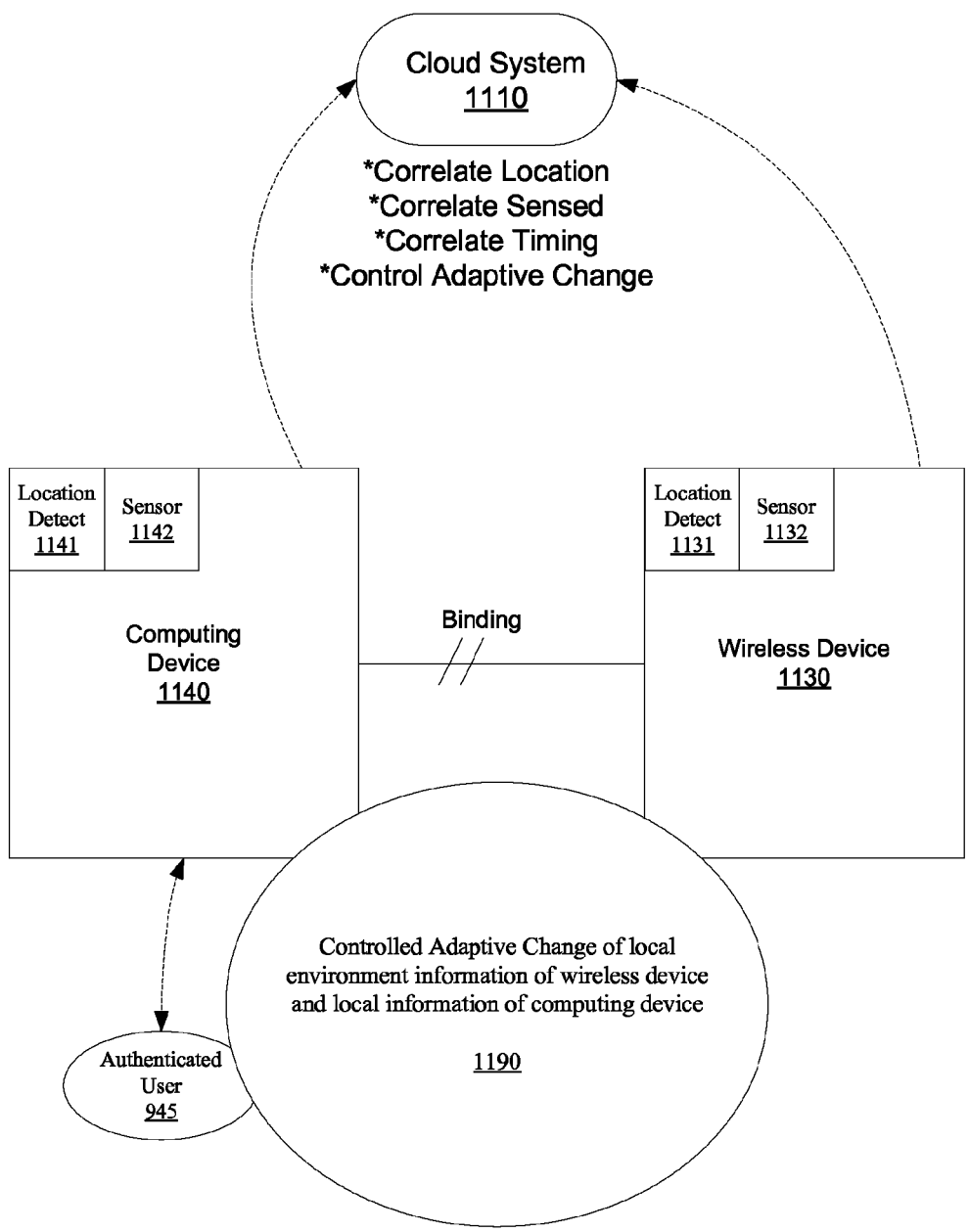
FIG. 11 shows a system for binding a computing device with a wireless device, according to an embodiment.

For at least some embodiments, the cloud system 110 verifies that the authenticated user is authorized to provide private network credentials for the wireless device 140, by establishing a binding between a computing device of the authenticated user and wireless device 140 as shown at least in FIGS. 9, 10, 11.

In at least some embodiments, the cloud system 110 verifies that the authenticated user is in the same geographic location as the wireless device 140 by verifying that the authenticated user's application is in range of at least one of the same access points or routers that the wireless device 140 is in range of. For another embodiment, the cloud system verifies that the authenticated user is in the same geographic location as the wireless device 140 by comparing GPS coordinates provided by the authenticated user's application to the GPS coordinates for the location of the wireless device 140.

For at least some embodiments, the authenticated user is the owner of the wireless device 140, and is using a credential management system (such as, credential management system 120) that is not specific to the product company that manufactured the device, e.g. it is a credential management system intended to be used to manage all the connected devices that the authenticated user owns. In this embodiment, the authenticated user may use an application or a web interface provided by the credential management system to deliver private network credentials to all the authenticated user's devices.

For at least some embodiments, the authenticated user is the owner of the wireless device 140 and is using a credential management system (such as, credential management system 120) from a retail channel that is intended to be used to manage all the authenticated user's connected devices that were purchased through that retail channel. In this embodiment, the authenticated user may use an application provided by the retail channel to deliver private network credentials to all the authenticated user's devices that were purchased through this retail channel.

For at least some embodiments, the authenticated user contracts with an internet service provider who provides the private network, and is using a credential management system operated by the internet service provider. In this embodiment, the authenticated user may use an application provided by the internet service provider to deliver private network credentials to the authenticated user's devices on the private network.

For at least some embodiments, the wireless device is a Wi-Fi enabled device that does not have a rich user interface, such as a wireless printer, a wireless thermostat, a wireless lightbulb, a wireless TV, a wireless video-streaming device, or a wireless video camera.

For at least some embodiments, the identifier is a unique identifier for the wireless device, such as the Media Access Control (MAC) Address for the wireless device 140, or the device serial number of the wireless device 140.

For at least some embodiments, securing credential distribution further includes (step 2) the cloud system 110 receiving the private network credentials of the authenticated user.

For at least some embodiments, the private network credentials are credentials that are used to authenticate the wireless device 140 onto the user's private network. One such embodiment would be a Pre-Shared-Key (PSK) configured in the router for the private network. Another embodiment is a username and password configured in the router 132, or in an authentication server that the router 132 may access to authenticate and authorize the wireless device 140. Another embodiment is enterprise-grade credentials, such as a certificate, that are used to authenticate the wireless device 140 onto a WPA2-Enterprise network. For at least some embodiments these credentials may be encrypted so they can be decrypted by the wireless device 140.

For at least some embodiments, the cloud system 110 verifies that the authenticated user is authorized to provide private network credentials to the wireless device 140.

For at least some embodiments, the cloud system 110 stores (step 3) the private network credentials and the identifier of the wireless device in, for example, storage 130.

For at least some embodiments, the cloud system 110 stores these credentials indefinitely. For at least some embodiments, the cloud system 110 discards them after some time, if the wireless device which is intended to receive these credentials does not authenticate to the cloud system 110 within the expected amount of time after the delivery of the private network credentials to the cloud system 110.

For at least some embodiments, securing credential distribution further includes (step 4) receiving an authentication request from a router 130, wherein the router 132 received the authentication request from the wireless device 140.

For at least some embodiment, the authentication request is automatically requested by the wireless device 140. Further, for at least some embodiments, the wireless device is preconfigured with device credentials.

For at least some embodiment, the router 132 is preconfigured to provide a network identifier that the wireless device 140 is preconfigured to recognize. For at least some embodiments, when the wireless device 140 is powered on, a Wireless Connection Manager in the wireless device 140 recognizes the network identifier, and automatically authenticates to that network with pre-configured device credentials. When the router 132 receives the device credentials, the router 132 authenticates the device credentials by sending an authentication request to the cloud system, which matches the credentials to the device credentials already pre-configured in the cloud system. If the credentials match, the cloud system 110 authorizes the router 132 to grant a limited internet connection to the wireless device 140.

For at least some embodiments, securing credential distribution further includes the cloud system 110 (step 5) returning a response to the authentication request to the router 132, wherein the response includes a list of approved internet domains and connection bandwidths limits the wireless device 140 is allowed to use. The router 132, or a network element connecting the router 132 to the internet, can implement firewall rules that allow the wireless device 140 to only send and receive network packets from the approved internet domains. The router 132 or network element can also limit the upstream and downstream bandwidth of the wireless device 140 to the connection bandwidth limits.

For at least some embodiments, securing credential distribution further includes preconfiguring (step 6) the cloud system 110 with the device credentials that are also preconfigured in the wireless device 140. For at least some embodiments the cloud system 110 is preconfigured with the device credentials that are also preconfigured in the wireless device 140 so that when the router 132 sends an authentication request to the cloud system 110, which contains the device credentials, the cloud system 110 can validate the device credentials by comparing them to the device credentials that have been preconfigured in the cloud system 110.

For at least some embodiments, securing credential distribution further includes the cloud system 1110 verifying that the authenticated user is authorized to provide private network credentials to the wireless device 140.

For at least some embodiments, securing credential distribution further includes the cloud system 110 (step 7) distributing the private network credentials to the wireless device 140. For at least some embodiments, when the cloud system 110 has authenticated the wireless device 140, the cloud system 110 determines that the credential management system 120 has provided private network credentials for the device identified by the device identifier. For at least some embodiments, the cloud system 110 delivers the private network credentials to the wireless device 140, which can use the private network credentials to obtain local network access with the private network credentials.

The wireless device 140 is then (step 8) allowed to obtain local network access with the private network credentials.

It is to be understood that while the devices of FIG. 1 may be shown directly connected, at least some embodiments include intermediary devices between devices shown connected. For example, any number of routers or servers may be connected between the credential storage system 120 and the cloud system 110, or between the router 132 and the cloud system 110, or between the wireless device and the router 132.

For at least some embodiments, the private network credentials are not encrypted. However, for at least some embodiments, the private network credentials are encrypted with device-specific credentials that are pre-configured in the cloud system 110 and the wireless device 140. For an embodiment, the encryption includes a shared key that both the wireless device 140 and the cloud system 110 have. For another embodiment, the cloud system 110 has the public key and the wireless device 140 has the private key, to encrypt the private network credentials. As previously described, the cloud system 110 distributes the credentials to the wireless device 140.

At least some embodiments further include an authenticated user of a mobile device that includes an application granting the credential management system to distribute the private network credentials of the authenticated user to the cloud system. For at least one embodiment, the application also provides location information, that the cloud system 110 may use to verify that the authenticated user is nearby to the wireless device 140, based on Wi-Fi and/or GPS attributes. For at least one embodiment, the application is for use in managing the particular wireless device that the user has purchased, and is provided by the product company that manufactured the wireless device. In another embodiment, the application is a general-purpose application used to manage many different types of wireless devices, and may be provided by the retail channel through which the device was purchased. In another embodiment, the application is a general purpose application used to manage all the wireless devices to be connected to the user's local network, and may be provided by the internet service provider who is providing internet service to the user's local network.

At least some embodiments further include a user of a mobile device that includes an application granting the cloud system authority to receive and distribute the private network credentials of the authenticated user. For at least one embodiment, the authenticated user delivers the private network credentials to the credential management system 120 for delivery to a single wireless device. In another embodiment, the authenticated user delivers the private network credentials to the credential management system 120 for delivery to one or more wireless devices owned by that user. In one embodiment, there is one authorization for all the user's wireless devices. In another embodiment, the user authorizes each wireless device independently.

At least some embodiments further include the cloud system 110 receiving a notification from the wireless device 140 that the private network credentials are invalid. Further, for at least some embodiments, the cloud system 110 requests new private network credentials from the credential management system 120. Further, the cloud system 110 receives new private network credentials from the credential management system. Further, the cloud system 110 distributes the new private network credentials to the wireless device.

For at least some embodiments, after delivery of the private network credentials to the wireless device 140, the wireless device 140 attempts to connect to the private network using the provided private network credentials. If the credentials are invalid, the wireless device 140 notifies the cloud system 110 that the credentials are invalid. In one embodiment, the cloud system 110 records that the credentials are invalid, and notifies the credential management system 120. In another embodiment, the cloud system 110 records that the credentials are invalid, and waits for the credential management system 120 to check on the connection status of the wireless device 140, at which time the credential management system 120 will be able to determine that the credentials are invalid.

At least some embodiments further include the cloud system 110 receiving a notification from the credential management system that previously distributed private network credentials should be invalidated. Further, the cloud system 110 distributes the notification to the wireless device, indicating to the wireless device to remove the previously distributed private network credentials.

Figure 2:
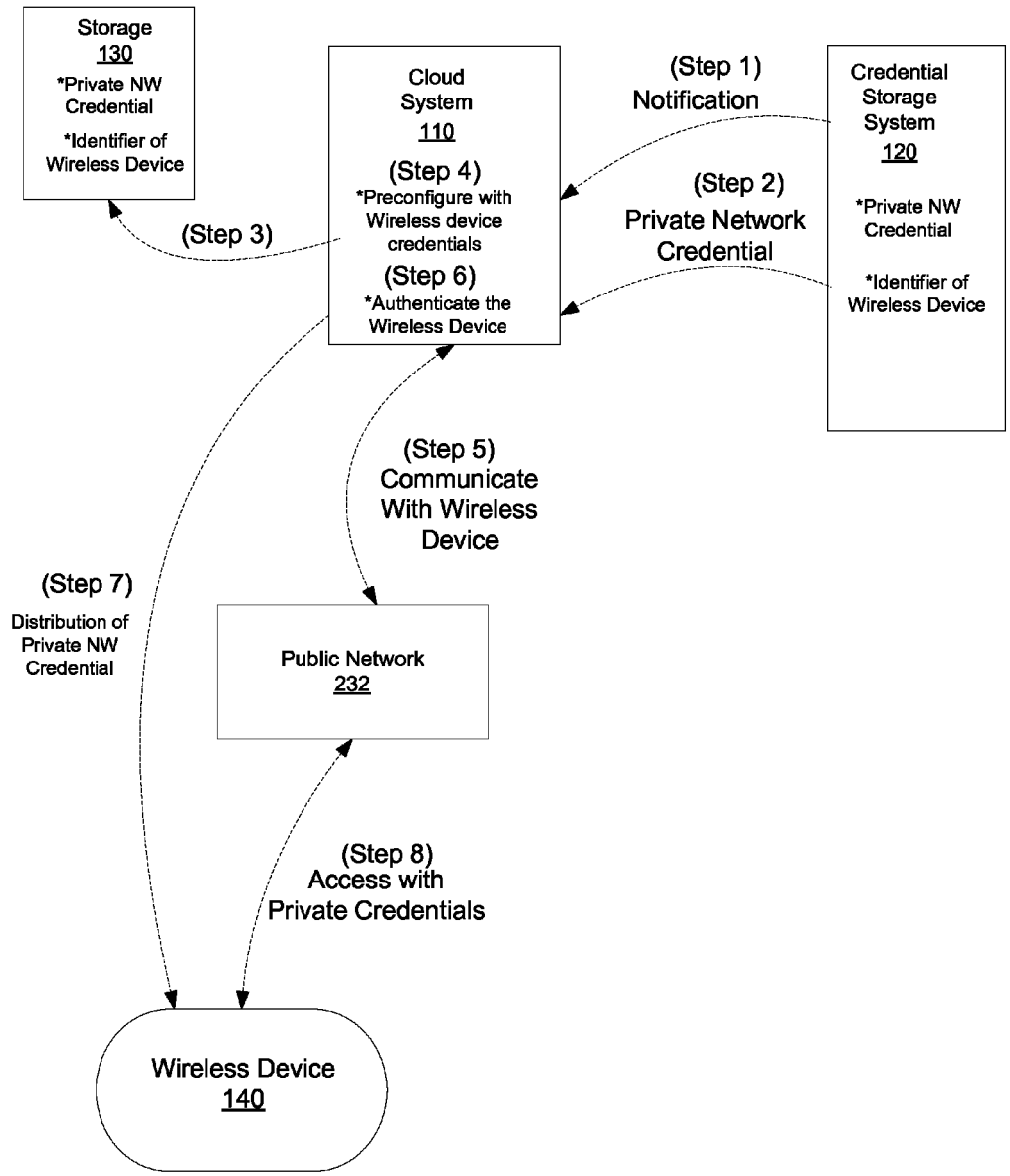
FIG. 2 shows a system for securing credential distribution, according to another embodiment.

FIG. 2 shows a system for securing credential distribution, according to another embodiment. This embodiment is similar to the embodiment of FIG. 1, but includes the wireless device 140 obtaining internet access through a public network 232.

For an exemplary embodiment, securing credential distribution begins (designated as step 1) with the cloud system 110 receiving notification from a credential management system 120 that a wireless device 140 is associated with an authenticated user of the credential management system 120. For at least some embodiments, the credential management system 120 stores private network credentials of the authenticated user. Further, for at least some embodiments, the cloud system 110 further receives an identifier of the wireless device 140 with the notification.

For at least some embodiments, securing credential distribution further includes (step 2) the cloud system 110 receiving the private network credentials of the authenticated user. For at least some embodiments, the cloud system 110 verifies that the authenticated user is authorized to provide private network credentials to the wireless device 140.

For at least some embodiments, the cloud system 110 stores (step 3) the private network credentials and the identifier of the wireless device in, for example, storage 130.

For at least some embodiments, securing credential distribution further includes preconfiguring (step 4) the cloud system 110 with the device credentials that are also preconfigured in the wireless device.

For at least some embodiments, securing credential distribution further includes (step 5) the cloud system 110 communicating with the wireless device 140 through internet access provided by the public network 232. For at least some embodiments, regardless of how the wireless device 140 connects to the internet, the cloud system 110 authenticates the wireless device 140 prior to delivering private network credentials to the wireless device 140.

For at least some embodiments, securing credential distribution further includes (step 6) the cloud system 110 authenticating the wireless device 140, ensuring that the wireless device is authorized to receive private network credentials. For at least some embodiments, the cloud system may not have authenticated the internet connection between the wireless device 140 and the cloud system, but still the cloud system 110 authenticates the wireless device 140, prior to delivering the private network credentials to the wireless device.

For at least some embodiments, securing credential distribution further includes (step 7) the cloud system 110 distributing the private network credentials to the wireless device, thereby allowing the wireless device to obtain local network access with the private network credentials.

As previously described, for at least some embodiments, securing credential distribution further includes the cloud system 110 (step 7) distributing the private network credentials to the wireless device 140. For at least some embodiments, when the cloud system 110 has authenticated the wireless device 140, the cloud system 110 determines that the credential management system 120 has provided private network credentials for the device identified by the device identifier. For at least some embodiments, the cloud system 110 delivers the private network credentials to the wireless device 140, which can use them to obtain local network access with the private network credentials.

The wireless device 140 is then (step 8) allowed to obtain local network access with the private network credentials.

For at least some embodiments, the cloud system and the wireless device are pre-configured with device credentials. The wireless device communicates with the cloud through internet access provided by a public network. The cloud system authenticates the wireless device, ensuring that the wireless device is authorized to receive private network credentials. The cloud system distributes the private network credentials to the wireless device.

Figure 3:
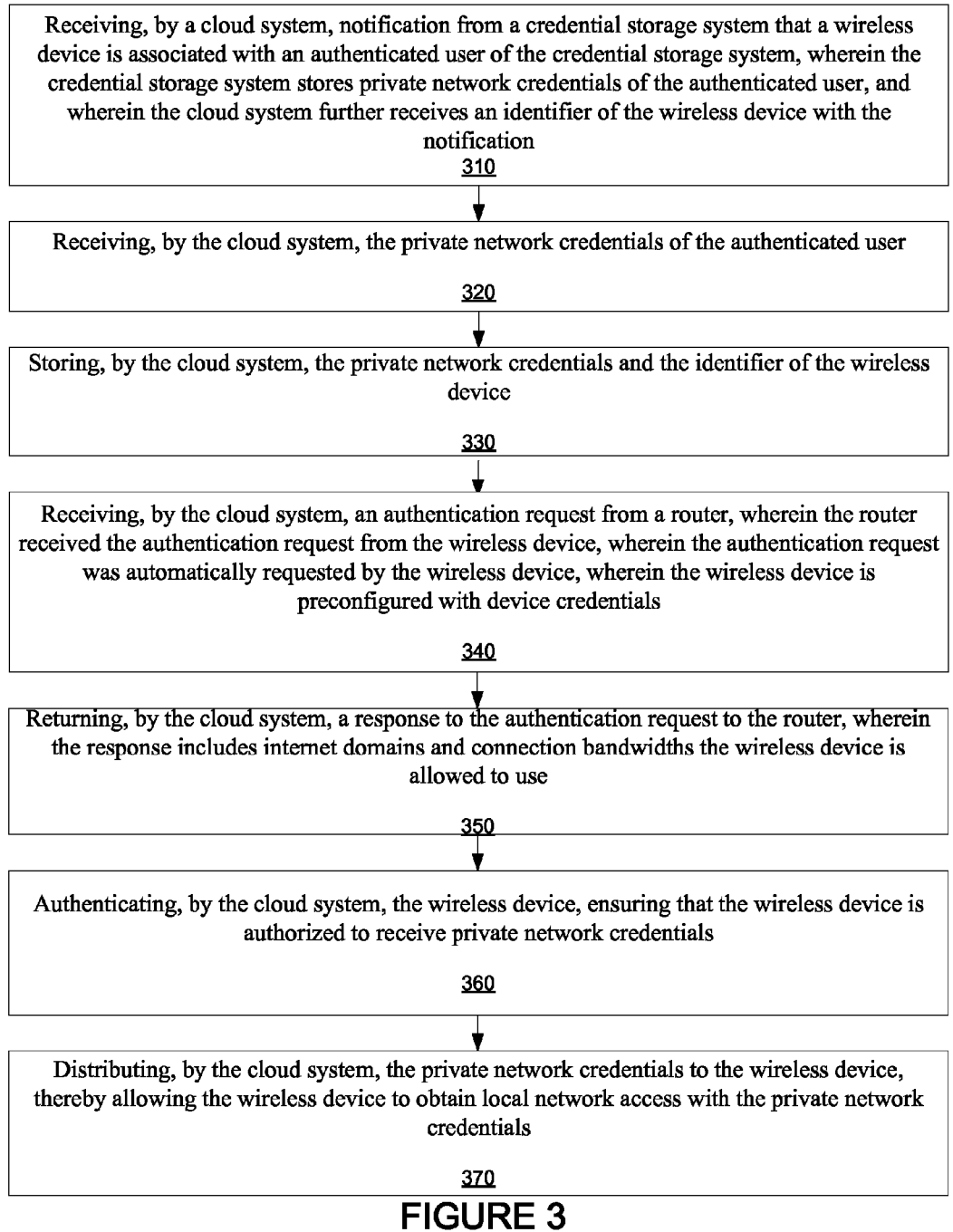
FIG. 3 is a flow chart that includes steps for securing credential distribution, according to an embodiment.

FIG. 3 is a flow chart that includes steps for securing credential distribution, according to an embodiment. A first step 310 includes receiving, by a cloud system, notification from a credential management system that a wireless device is associated with an authenticated user of the credential management system, wherein the credential management system stores private network credentials of the authenticated user, and wherein the cloud system further receives an identifier of the wireless device with the notification.

A second step 320 includes receiving, by the cloud system, the private network credentials of the authenticated user.

An optional step, not shown, includes verifying that the authenticated user is authorized to provide private network credentials to the wireless device.

A third step 330 includes storing, by the cloud system, the private network credentials and the identifier of the wireless device.

An optional step not shown includes preconfiguring the cloud system with the device credentials that are also preconfigured in the wireless device.

A fourth step 340 includes receiving, by the cloud system, an authentication request from a router, wherein the router received the authentication request from the wireless device, wherein the authentication request was automatically requested by the wireless device, wherein the wireless device is preconfigured with device credentials.

A fifth step 350 includes returning, by the cloud system, a response to the authentication request to the router, wherein the response includes internet domains and connection bandwidths the wireless device is allowed to use.

A sixth step 360 includes authenticating, by the cloud system, the wireless device, ensuring that the wireless device is authorized to receive private network credentials.

A seventh step 370 includes distributing, by the cloud system, the private network credentials to the wireless device, thereby allowing the wireless device to obtain local network access with the private network credentials.

As previously described, for at least some embodiments the private network credentials are encrypted. For at least some embodiments, the private network credentials are encrypted with a key that is pre-configured in the cloud system and the wireless device. Further, for at least some embodiments, the private network credentials are not encrypted.

As previously described, for at least some embodiments, a user of a mobile device that includes an application, grants the credential management system the authority to distribute the private network credentials of the authenticated user to the cloud system. For at least some embodiments, a user of a mobile device that includes an application granting the cloud system authority to receive and distribute the private network credentials of the authenticated user.

As previously described, at least some embodiments further include receiving, by the cloud system, a notification from the wireless device that the private network credentials are invalid, requesting, by the cloud system, new private network credentials from the credential management system, receiving, by the cloud system, new private network credentials from the credential management system, and distributing, by the cloud system, the new private network credentials to the wireless device.

As previously described, at least some embodiments further include receiving, by the cloud system, a notification from the credential management system that previously distributed private network credentials should be invalidated, and distributing, by the cloud system, the notification to the wireless device, indicating to the wireless device to remove the previously distributed private network credentials.

Figure 4:
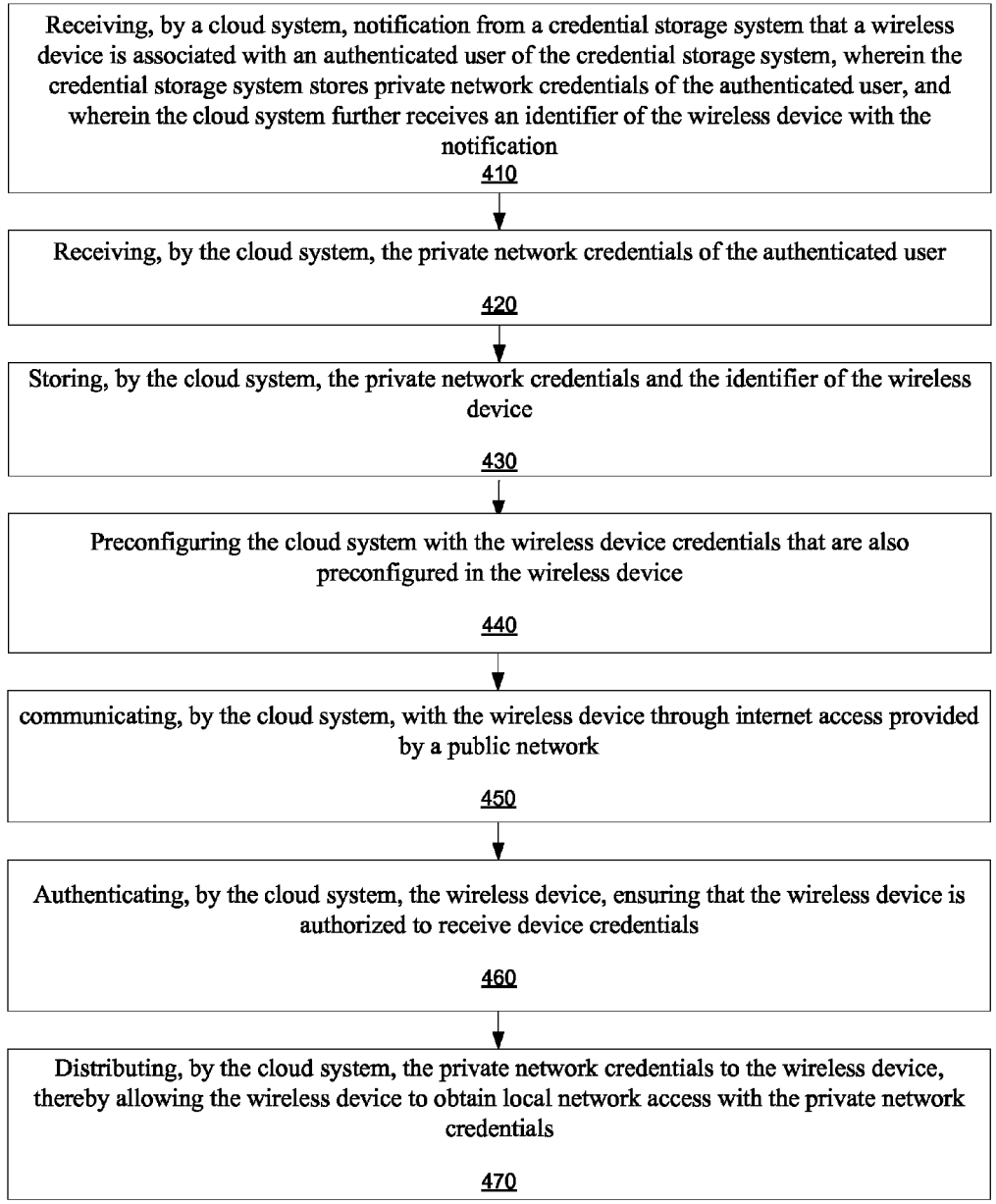
FIG. 4 is a flow chart that includes steps for securing credential distribution, according to another embodiment.

FIG. 4 is a flow chart that includes steps for securing credential distribution, according to another embodiment. A first step 410 includes receiving, by a cloud system, notification from a credential management system that a wireless device is associated with an authenticated user of the credential management system, wherein the credential management system stores private network credentials of the authenticated user, and wherein the cloud system further receives an identifier of the wireless device with the notification.

A second step 420 includes receiving, by the cloud system, the private network credentials of the authenticated user.

An optional step, not shown, includes verifying that the authenticated user is authorized to provide private network credentials to the wireless device.

A third step 430 includes storing, by the cloud system, the private network credentials and the identifier of the wireless device.

An optional fourth step 440 includes preconfiguring the cloud system with the wireless device credentials that are also preconfigured in the wireless device.

A fifth step 450 includes communicating, by the cloud system, with the wireless device through internet access provided by a public network.

A sixth step 460 includes authenticating, by the cloud system, the wireless device, ensuring that the wireless device is authorized to receive private network credentials.

A seventh step 470 includes distributing, by the cloud system, the private network credentials to the wireless device, thereby allowing the wireless device to obtain local network access with the private network credentials.

As previously described, for at least some embodiments the private network credentials are encrypted. Further, for at least some embodiments, the private network credentials are not encrypted.

As previously described, for at least some embodiments, a user of a mobile device that includes an application, grants the credential management system the authority to distribute the private network credentials of the authenticated user to the cloud system. For at least some embodiments, a user of a mobile device that includes an application granting the cloud system authority to receive and distribute the private network credentials of the authenticated user.

As previously described, at least some embodiments further include receiving, by the cloud system, a notification from the wireless device that the private network credentials are invalid, requesting, by the cloud system, new private network credentials from the credential management system, receiving, by the cloud system, new private network credentials from the credential management system, and distributing, by the cloud system, the new private network credentials to the wireless device.

As previously described, at least some embodiments further include receiving, by the cloud system, a notification from the credential management system that previously distributed private network credentials should be invalidated, and distributing, by the cloud system, the notification to the wireless device, indicating to the wireless device to remove the previously distributed private network credentials.

While the embodiments described include the cloud system distributing private network credentials to the wireless device, the wireless device needs to be connected through a network to the cloud system. The following described embodiments provide at least some embodiments for connecting the wireless device to the cloud system.

Figure 5:
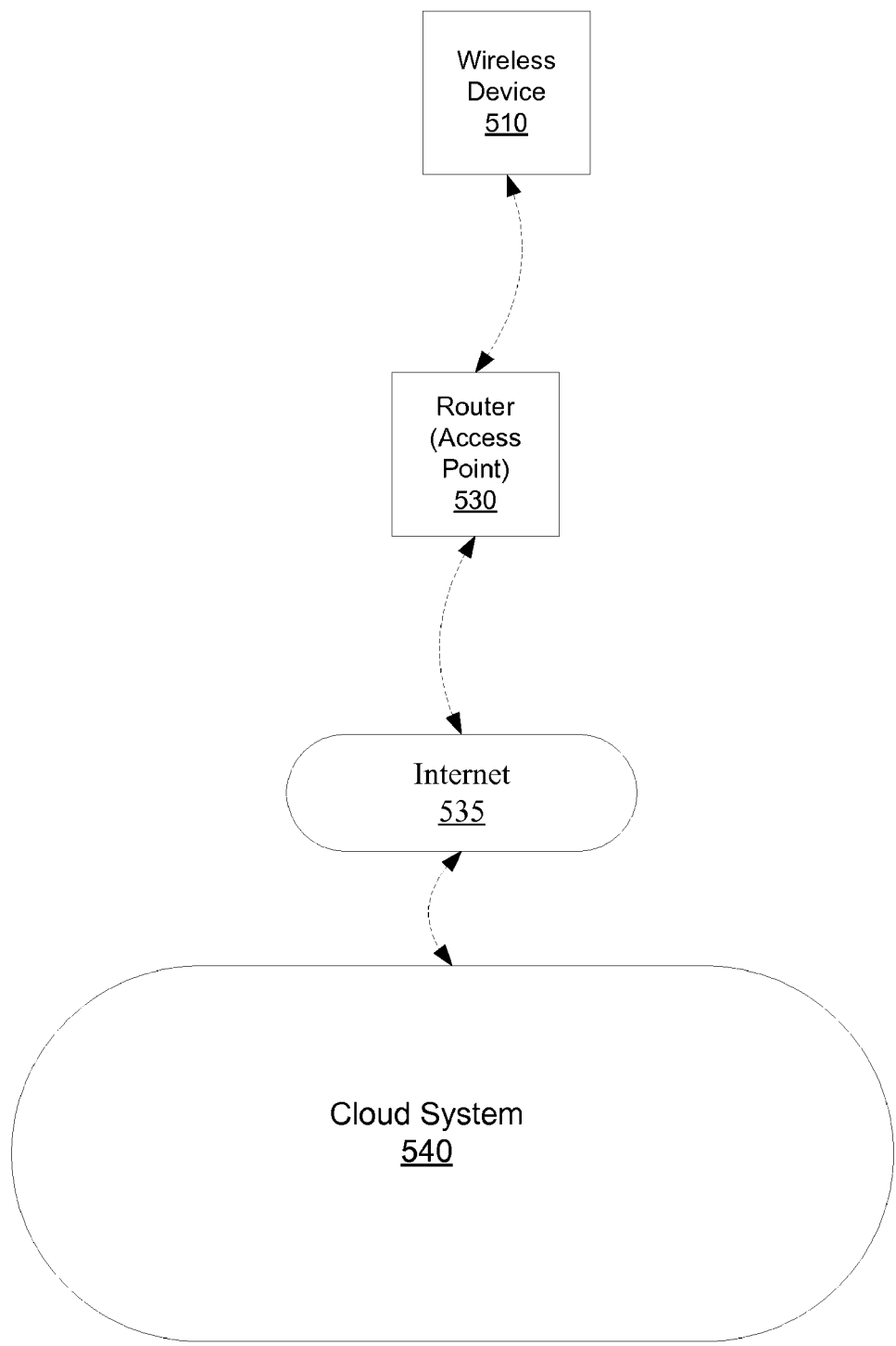
FIG. 5 shows a system for connecting a wireless device to a network, according to an embodiment.

FIG. 5 shows a system for connecting a wireless device 510 to a network, according to an embodiment. For an embodiment, the wireless device 510 automatically requests association to a router 530. Further, for at least some embodiments, a cloud system 540 receives an authentication request from the router 530, wherein the router 530 received the authentication request from the wireless device 510. Further, for at least some embodiments, the cloud system 540, returns a response to the authentication request to the router 530, wherein the response includes internet domains and connection bandwidths the wireless device is allowed to use, wherein the wireless device has been preconfigured with credentials that are also preconfigured into the cloud system. As shown, for an embodiment, the cloud system 540 is connected to the router 530 through, for example, the internet 530. As shown, the router 530 can be connected to the cloud system 540 through the internet 535.

For at least some embodiments, the cloud system 540 includes one or more servers, and one or more databases. The databases include information on the wireless devices, the pre-shared keys and certificates, the access plans for the devices, the internet domains that the devices are allowed to communicate with, the networks that the devices are allowed to join, and the connection bandwidth parameters of the devices. The servers of the cloud system 540 receive the authentication requests from the routers and devices, and use the data in the database to decide whether to authenticate the device, and what internet domains and connection bandwidth parameters should be passed back to the router.

For at least some embodiments, the authentication request includes the negotiation of a set of security keys to secure the transmission of the wireless device credentials (pre-shared key or certificate). For an embodiment, the authentication process includes mutual authentication of the router and the cloud system through the use of digital certificates or a shared secret.

For an embodiment, the authentication process includes the router 530 redirecting the wireless device 510 to a captive portal, which resides on a server separate from the cloud system 540, and which negotiates the authorization and authentication process on behalf of the router 530 before passing the connection bandwidths and internet domain parameters back to the router 530.

For an embodiment, the authentication process include the router 530 implementing firewall rules on the router 530 to prevent the wireless device 510 from connecting to domains that are not on the list of approved domains.

For an embodiment, the authentication process includes the router 530 implementing bandwidth limitations on the device connection which prevents the wireless device 510 from communicating outside the range of these bandwidth limitations.

At least some embodiments include a manufacturer of the wireless device 510 registering the wireless device 510 with the cloud system 540, and agreeing upon a credential for the wireless device 510. For an embodiment, the credential includes a pre-shared key (password) or a digital certificate. For an embodiment, the credentials are stored on non-volatile memory of the wireless device 510.

Further, for an embodiment, the manufacturer also specifies the internet domains the wireless device 540 needs to connect to, and chooses a data access plan, which may include connection bandwidths. For an embodiment, the connection bandwidth may include an upstream and/or downstream bandwidth, a duration of the connection, a total time on the network, an aggregate bandwidth of over time, and/or an aggregate data cap (for example 1 gigabyte per month). As will be described, for an embodiment, the connection bandwidth is adaptively adjusted.

For at least some embodiments, the cloud service 540 is coordinated with a set of wireless routers in homes of users that allow access to the internet if the wireless devices of the users are approved by the cloud service.

For an embodiment the cloud system 540 is connected to the router 530 via a proxy cloud system. The proxy cloud system in this case routes the authentication requests to the cloud system 540 based on the realm identified in the device credentials.

For at least some embodiments, the connection bandwidth is adaptively adjusted based on a variety of different parameters, including business agreements, available bandwidth, the service level agreed with the device manufacturer, the service level agreed with the router operator, the service level agreed with the internet service subscriber, the time of day, the amount of data the device has already used, the historical data usage of the wireless device 510, or other variables.

For at least some embodiments, the manufacturer puts the credential and the network configuration on the wireless device 510 when the wireless device 510 is manufactured. The network configuration defines the set of networks the wireless device 510 should try to join. For an embodiment, the network configuration is updated periodically, and the wireless device 510 receives, for example, the updated network configurations from time to time over the internet.

For an embodiment, the network configuration is updated based on new business relationships, aggregated or historical network performance data, network performance data from specific routers, or other variables.

For at least some embodiments, when the wireless device 510 is powered up (power turned on) by a user, the wireless device 510 automatically attempts to connect to one of the wireless networks included in the network configuration. When the device attempts to connect, the router (such as, router 530) the wireless device 510 is attempting to connect to queries the cloud service (of the cloud system 540) to authenticate the wireless device 510 and authorize the wireless device 510 to join the network. For an embodiment, the cloud service (of the cloud system 540) sends back to the router 530 allowed parameters of the connection. For an embodiment, the allowed parameters include the domains the wireless device 510 is allowed to access and the bandwidth and other connection parameters.

As described, at least some embodiments address some of the biggest security risks for wireless-connected products. The wireless device(s) are given access to the internet—but only very limited access, because the domains the wireless devices are allowed to connect to is limited to the domains preconfigured by the device manufacturer. This prevents devices from being hacked and used as part of denial-of-service and other security attacks.

At least some of the described embodiments provide users a way to use internet-connected devices that may not be trusted. The devices are joining the wireless network, but are not authorized to communicate with other devices in the local network—they are specifically bound to communicate only with the specified internet domains. This feature allows for safe, secure zero-touch joining. Further, because the device joins the wireless network automatically, and because the user may wish to have the device on a different, secure wireless network, there is some complexity on the device in managing the network configurations and the connections to the various networks.

For an embodiment, a wireless connection manager (WCM) that operates on the wireless device dynamically decides whether the wireless device should join the user's (user of the wireless device) secure personal network or the authorized network (the network that device is allowed to join through authentication from the cloud service of the cloud system). For an embodiment, the wireless connection manager prioritizes a secure personal network, but opting to use the network which is authorized by the cloud service of the cloud system if network performance of the secure personal network falls below a threshold level. For an embodiment, the wireless connection manager of the wireless device selects to send at least some data on a secure personal network, and send at least some other data on the network which is authorized by the cloud service of the cloud system. The partitioning of network connectivity across time and across data sources or data types can be done dynamically by the device, and can be directed by the cloud system or by configurations pulled by the device from the cloud system. That is, an embodiment includes dynamically partitioning between the sending of the at least some data on the secure personal network, and the sending of at least some other data on the network authorized by the cloud service of the cloud system, wherein the dynamic partitioning is performed by either the wireless device or by the cloud system.

For an embodiment, the WCM is software that runs on the wireless device 510 to manage the wireless connection and configuration. The WCM uses the network configuration to decide which network to join. If a user wants the wireless device 510 to connect on a different network, the WCM prioritizes that network, and stays connected to it if possible. It can fall back to another network if the preferred network is not available. For at least some embodiments, the WCM includes device code that manages the automatic joining the network.

Further, for an embodiment, the WCM may also include software to upload wireless network performance or technical information to the cloud service 540. The WCM can upload information such as network traffic patterns, availability or visibility of wireless networks, network performance parameters, device communication parameters, device usage data, device logs, or other device data.

For an embodiment, the WCM also updates the cloud service 540 with the real time status of the wireless device 510. This status may include information about the network the device is connected to such as the network name, router MAC address, and signal strength.

As previously described, at least some of the described embodiments make it dramatically easier to connect internet-enabled products to wireless networks. Many of these devices (such as, Wi-Fi-enabled printers, lightbulbs, and/or kitchen appliances) do not have a rich user interface with a screen and keyboard, so it is difficult to configure these devices to connect to the wireless network. At least some of the described embodiments create a way to instantly and securely connect devices to the internet.

Figure 6:
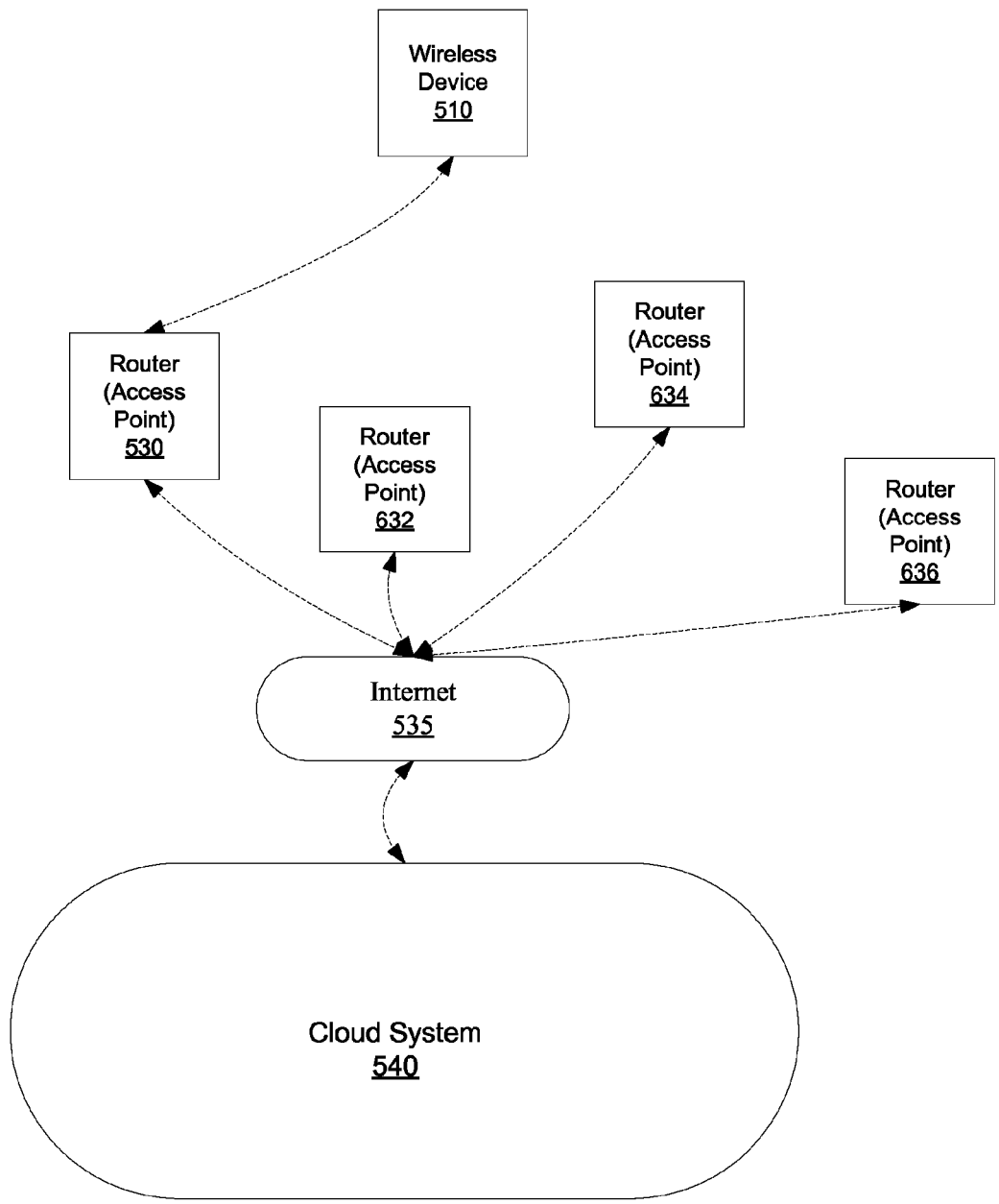
FIG. 6 shows another system for connecting a wireless device to a network, according to an embodiment.

FIG. 6 shows another system for connecting a wireless device to a network, according to an embodiment. For an embodiment the router 530 is one of a plurality of routers 632, 634, 636 that the wireless device 510 is operable to attempt to associate with, and wherein the plurality of routers that wireless device 510 is operable to associate with is adaptively updated at the wireless device.

For at least some embodiments, the wireless device 510 periodically retrieves a list of approved networks from a cloud service of the cloud system 540, wherein the list of approved networks includes a prioritization of the approved networks. When the wireless device 510 looks for networks to join, the wireless device 510 compares the list of available networks advertised from nearby routers from a scan of a local wireless environment with the list of approved networks, and chooses the highest priority network that is available to be joined. By updating the list of approved networks on the cloud service of the cloud system 540, the wireless device 510 is adaptively updated to associate with a specific set of routers.

For an embodiment, the adaptive updating is done based on a number of criteria including cost, network performance, device connectivity success rate, bandwidth, limitations on the connection parameters, limitations on the domains, signal strength, or other network parameters. For example, the wireless device could periodically update its connection information to the cloud system, and if the device repeatedly falls off of a particular network or has communications trouble on a particular network, the cloud system could update the network configuration to lower the priority of that network. That is, for an embodiment, the cloud service of the cloud system 540 adaptively updates the list of approved networks, wherein adaptive updating includes lowering a priority of an approved network if the wireless device repeatedly has problems communicating with the approved network.

For an embodiment the router 530 is one of a plurality of routers 530, 632, 634, 636 that the wireless device 510 is allowed to authenticate against, and wherein the plurality of routers 530, 632, 634, 636 that the wireless device 510 is allowed to authenticate against is adaptively updated in the cloud system 540.

For at least some embodiments, the cloud system 540 is configured to specify which devices are allowed to join which routers. For at least some embodiments, when a router sends a message to the cloud service of the cloud system 540 to authenticate a specific wireless device, the cloud service approves or rejects that request based on this configuration. For at least some embodiments, this configuration is dynamically updated to change which wireless devices can successfully associate with which routers.

For an embodiment, this configuration for approving devices on a router is done based on a number of different parameters including connectivity cost, network performance, network bandwidth, business relationships between the entity that designs, builds, or sells the device and the company that designs, builds, sells, or operates the router. For an embodiment, this configuration is updated over time as these parameters or relationships change.

An embodiment includes preconfiguring the internet domains and the connection bandwidth into the cloud system 540. For at least some embodiments, the internet domains and connection bandwidth configurations, which are stored in the cloud system, can be modified over time—even after a device has been deployed.

For an embodiment, this modification is done manually by an operator of the cloud system 540, based on business priorities or technical metrics like bandwidth or network performance. For an embodiment, these modifications are done automatically by analysis of the wireless device 510 or network performance, as monitored by the wireless device 510 or the cloud system 540.

For at least some embodiments, the internet domains and connection bandwidth parameters are updated at any time in the cloud system 540. When a wireless device attempts to associate with a router, and the router sends the authentication request to the cloud system 540, the cloud system 540 dynamically determines the domains and connection bandwidth configuration. For at least some embodiments, this configuration is updated at any time, and the new parameters are sent to the router the next time the wireless device attempts to associate.

This allows device manufacturers to provide dynamic services to their customers by expanding the network capability of the devices, to remotely turn on a network connection for a specific device or set of devices. For example, a kitchen appliance company makes a Wi-Fi connected appliance. The appliances are configured at the time of manufacture to connect only to the cloud service. If the appliance manufacturer receives a warranty claim or a service call, they can dynamically provision a direct connection to the device by adding an additional internet domain to the provisioned connection for the device. This allows the appliance manufacturer to communicate directly to the device to identify what is wrong. This can reduce the cost of providing service, eliminate field service calls, and enable better customer support.

For an embodiment, the cloud system 540 is preconfigured to accept authentication requests from the router. For an embodiment, the cloud system is configured to only accept authentication requests from a specific set of routers. By rejecting authentication requests from non-approved routers, the cloud system 540 eliminates some security vulnerabilities around repeated retries of passwords. For an embodiment, this pre-configuration can be periodically changed as a company rolls out new routers, or as old routers are removed from service.

For an embodiment, the router is configured to send the authentication request to the cloud system 540. For an embodiment, the deployed routers are configured to send authentication requests to the cloud system 540, either by provisioning a specific internet domain or IP address. For an embodiment, the routers are configured through software at the time of manufacture, or through a configuration or software update while in the field. This configuration tells the router that devices that attempt to associate should be authenticated and authorized by the cloud service 540.

For at least some embodiments, the cloud service (of the cloud system 540) is configured to and updated to allow or disallow specific wireless devices to associate with specific routers. For an embodiment, this configuration happens in two places: in the wireless device through its network configuration, and in the cloud service through the authorization process.

FIG. 7 shows tables that depicts wireless device and router configurations, according to an embodiment. As shown in Table 1 of FIG. 7, there may be Devices (#1, #2, and #3) and three sets of Routers (set A, set B, and set C). The Devices and Routers may be configured as shown in the table 1 of FIG. 7.

In this case Device #1 may try to join Router Set A or Router Set C, but will only be approved to join Router Set A. This configuration can be dynamically changed in the Cloud System to update the network configurations on the devices, and to update which Router Sets the devices are approved to connect to. For example the configuration above may be updated as shown by Table 2 of FIG. 7, wherein Device #1 is allowed to join Router Set C.

Figure 8:
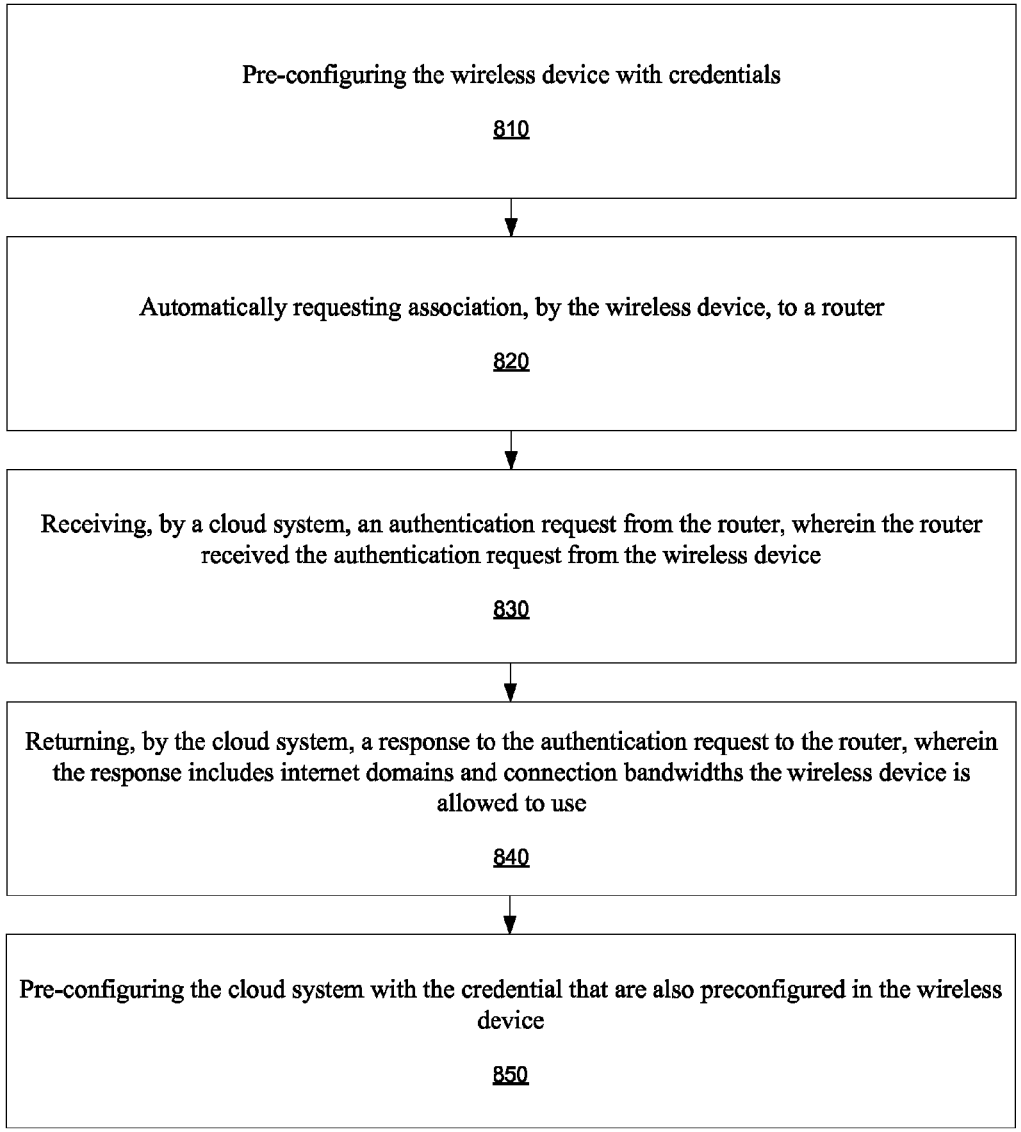
FIG. 8 is a flow chart that includes steps of an example of a method of connecting a wireless device to a network, according to an embodiment.

FIG. 8 is a flow chart that includes steps of an example of a method of connecting a wireless device to a network, according to an embodiment. A first step 810 includes preconfiguring the wireless device with credentials. A second step 820 includes automatically requesting association, by the wireless device, to a router. A third step 830 includes receiving, by a cloud system, an authentication request from the router, wherein the router received the authentication request from the wireless device. A fourth step 840 includes returning, by the cloud system, a response to the authentication request to the router, wherein the response includes internet domains and connection bandwidths the wireless device is allowed to use. A fifth step 850 includes preconfiguring the cloud system with the credentials that are also preconfigured in the wireless device.

As previously described, for an embodiment, the router is one of a plurality of routers that the wireless device is operable to attempt to associate with, and wherein the plurality of routers that wireless device is operable to associate with is adaptively updated at the wireless device.

As previously described, for an embodiment, the router is one of a plurality of routers that the wireless device is allowed to authenticate against, and wherein the plurality of routers that the wireless device is allowed to authenticate against is adaptively updated in the cloud system.

As previously described, an embodiment further includes preconfiguring the internet domains and the connection bandwidths into the cloud system.

As previously described, for an embodiment, the credentials comprise a pre-shared key or a digital certificate. As previously described, for an embodiment the credentials are stored on non-volatile memory.

As previously described, for an embodiment the connection bandwidths includes at least one of upstream bandwidth, downstream bandwidth, total time on network or aggregate bandwidth over a period of time. As previously described, for an embodiment, the connection bandwidths is adaptively adjusted.

As previously described, for an embodiment, the cloud system is preconfigured to accept authentication requests from the router.

As previously described, for an embodiment, the router is configured to send the authentication request to the cloud system.

An embodiment includes a program storage device readable by a machine of a cloud system, tangibly embodying a non-transitory program of instructions that when executed by the machine of the cloud system cause the machine to perform a method of connecting a wireless device to a network. For an embodiment, the method includes receiving, by a cloud system, an authentication request from a router, wherein the router received the authentication request from the wireless device, wherein the authentication request was automatically requested by the wireless device, and returning, by the cloud system, a response to the authentication request to the router, wherein the response includes internet domains and connection bandwidths the wireless device is allowed to use.

For an embodiment, the router is one of a plurality of routers that the wireless device is operable to attempt to associate with, and wherein the plurality of routers that wireless device is operable to associate with is adaptively updated at the wireless device. For an embodiment, the router is one of a plurality of routers that the wireless device is allowed to authenticate against, and wherein the plurality of routers that the wireless device is allowed to authenticate against is adaptively updated in the cloud system.

Verifying the Authenticated User

As previously described, at least some embodiments include verifying that the authenticated user is authorized to provide credentials to the wireless device. As previously described, for an embodiment, this includes by verifying the authenticated user is in the same geographic location as the wireless device 140. Stated more generally, at least some embodiments include verifying that the authenticated user is authorized to provide credentials to the wireless device by confirming or establishing a binding between the wireless device and a computing device of the authenticated user.

FIG. 9 shows a system for binding a computing device with a wireless device, according to an embodiment. For this embodiment, the system includes a cloud system network that includes a cloud system 910. Generally, the cloud system 910 includes one or more servers operative to receive information from the wireless devices and computing devices, store that information, and run algorithms on the collected data to determine whether the computing devices and wireless devices are in the same physical location or owned or operated by the same user.

For an embodiment, the cloud system 910 binds an authenticated user 945 with a wireless device 930. As shown, the wireless device 930 is connected through the network (which generally includes an access point connected, for example, to the internet 935) to the cloud system 910. The wireless device can include any consumer device, such as, an internet-connected washing machine, an internet-connected thermostat, an internet-connected television, or an internet-connected toy.

Further, the system includes a wireless device cloud management system 920 that is connected through the network to the cloud system 910. For at least some embodiments, the wireless device cloud management system 920 includes one or more servers that store information that binds specific wireless devices to specific user accounts, and allows authenticated users to retrieve data from or control the bound wireless devices. For an embodiment, the wireless device cloud management system 920 is the previously described credential storage management system 120 or is associated with the credential storage management system 120. For an embodiment, the wireless device cloud management system 920 communicates information of the wireless device and/or the authenticated users to the credential storage management system 120.

For at least some embodiments, the cloud system 910 is operative to receive local environment information from the wireless device 930. The local environment information includes, for example, a location of the wireless device 930, an estimated location of the wireless device 930, and/or sensed signals or conditions proximate to the wireless device 930. For an embodiment, the local environment information of the wireless device 930 includes a global position system (GPS) location or a determined latitude and longitude of the wireless device. For an embodiment, the local environment information of the wireless device 930 includes sensed wireless access point signatures received by the wireless device 930. That wireless access point signatures can include received WiFi signatures, received Bluetooth signatures, received cellular signatures, or received long-range-radio signatures. For at least some embodiments, the local environment information includes other sensed signals as well. For example, for an embodiment, the other sensed signals include at least one of sensed audio, sensed images, sensed vibration, sensed light, sensed temperature, sensed biometrics, or sensed gasses.

For at least some embodiments, the cloud system 910 is operative to receive local information from a computing device 940 of the authenticated user. For at least some of the described embodiments, the computing device 940 can include a smartphone, a laptop computer, a tablet computer, a desktop computer, a router, or a standalone computing device.

Similar to the local environmental information of the wireless device 930, for at least some embodiments, the local environment information includes, for example, a location of the computing device 940, an estimated location of the computing device 940, and/or sensed signals or conditions proximate to the computing device 940. For an embodiment, the local environment information of the computing device includes a global position system (GPS) location or a determined latitude and longitude of the computing device. For an embodiment, the local environment information of the computing device 940 includes sensed wireless access point signatures received by the computing device 940. That wireless access point signatures can include received WiFi signatures, received Bluetooth signatures, received cellular signatures, or received long-range-radio signatures. For at least some embodiments, the local environment information includes other sensed signals as well. For example, for an embodiment, the other sensed signals include at least one of sensed audio, sensed images, sensed vibration, sensed light, sensed temperature, or sensed gasses For at least some embodiments, the cloud system 910 is operative to compare the local environment information of the wireless device 930 with the local information of the computing device 940. For an embodiment, the comparison includes matching a physical location or an estimated physical location of the wireless device with a physical location or an estimated physical location of the computing device. For an embodiment, the comparison includes matching a wireless access point signature of the wireless device 930 with a wireless access point signature of the computing device 940. For an embodiment, the comparison includes additionally or alternatively matching other sensed signals of the wireless device with other sensed signals of the computing device. For at least some embodiments, the other sensed signals includes at least one of sensed audio, sensed images, sensed vibration, sensed light, sensed temperature, sensed biometrics, or sensed gasses.

For at least some embodiments, the cloud system 910 is operative to bind the wireless device 930 with the computing device 940 based on comparison of the local environment information of the wireless device 930 with the local information of the computing device 940. For at least some embodiments, the binding is completed if the matching or comparison of the local environment information of the wireless device 930 with the local information of the computing device is within a predetermined threshold. That is, for example, the binding is completed if the location or the estimated location of the wireless device is within a threshold distance from the location or the estimated location of the computing device. Further, for example, for an embodiment, the binding is completed upon determining that wireless access point signatures received by the wireless device are within a similarity of wireless access point signatures of the computing device. For example, if the computing device and the wireless device both receive wireless signals form the same Wi-Fi router, then it can be assume that the computing device and the wireless device are in physical proximity. Further, for example, for an embodiment, the binding is completed upon determining that other sensed signals of the wireless device are similar to the sensed signals of the computing device. For example, an audio recording from the wireless device and the computing device can be compared and it can be determine that the computing device and the wireless device are likely in the same room. As another example, a picture or video from the computing device can be compared with a picture or video from the wireless device. As another example, an audio sensed by the computing device can be compared with the audio sensed by the wireless device. As another example, a vibration sensed by the wireless device can be compared with a vibration sensed by the computing device.

For at least some embodiments, the cloud system 910 is operative communicate information to the wireless device cloud management system that indicates that the binding between the wireless device and the computing device has occurred.

FIG. 10 shows another system for binding an authenticated user of the computing device with the wireless device, according to an embodiment. FIG. 10 shows that the wireless device cloud management system is operative to allow the authenticated user to control the wireless device upon receiving the information that indicates that the binding between the wireless device and the computing device has occurred.

At least some embodiments includes a connected wireless device (a wireless device that has internet connectivity), an access point or router (the device that allows joining of a network, for example a WiFi router in a home), a device cloud application (the software application, which may be owned and operated by the connected wireless device manufacturer, that connects to the device), the federated device cloud application (which may be run as a service by an operator), and the internet (providing connectivity from the access point or router to the wireless device connected application).

At least some of the described embodiments make it dramatically easier to connect internet-enabled products to wireless networks. Many of these devices (such as, Wi-Fi-enabled printers, lightbulbs, and/or kitchen appliances) do not have a rich user interface with a screen and keyboard, so it is difficult to configure these devices to connect to the wireless network. At least some of the described embodiments create a way to instantly and securely connect devices to the internet.

FIG. 11 shows a system for binding a computing device 1140 with a wireless device 1130, according to an embodiment. As shown, the computing device includes a location detection device 1141 and at least one sensor 1142. Further, as shown, the wireless device 1130 includes a location detection device 1131 and at least one sensor 1132.

As previously described, the location detection devices 1131, 1141 can include any number of location detection devices, such as, global positioning systems (GPS), location detection through wireless access point signature matching, accelerometers, gyroscopes, magnetic sensors, and/or compasses. The location detection devices 1131, 1141 generate location information.

As previously described, the at least one sensors 1132, 1142 can include any number of sensors, such as, audio, vibration, image, etc. At least some embodiments include any number of sensors, wherein the sensed signals are maintained individually or combined. The at least one sensors 1132, 1142 generate sensed information.

The computing device 1140 and the wireless device 1130 upload (typically through a network) the location detection information and sensed information to the cloud system 1110. As previously described, the cloud system 1110 determines whether to bind the computing device 1140 and the wireless device 1130 based on matching or comparing or correlating the local environment information (including at least the location detection information and sensed information) of the wireless device 1130 with the local information (including at least the location detection information and sensed information) of the computing device 1140.

As shown, and previously described, the cloud system 1110 can alternatively, or additionally match, compare or correlate timing of the environment information of the computing device 1140 and the wireless device 1130. That is, for example, the location environment information of the wireless device 1120 and the local information of the computing device can be time-stamp before being uploaded to the cloud system 1110. The cloud system can bind the computing device 1140 with the wireless device 1130 by time correlating features of the location detection information and sensed information of the computing device 1140 with location detection information and sensed information of the wireless device 1130.

For at least some embodiments, the cloud system 1110 can further its ability to bind the computing device 1140 with the wireless device 1130 by causing or instructing a user to adaptively control changes of the environment (shown in FIG. 11 at 1190) local to either or both the computing device 1140 and the wireless device 1130. The adaptive changes can be sensed, to further enable the cloud system 1110 to determine whether to bind the computing device 1140 with the wireless device 1130.

Once the binding of the computing device 1140 with the wireless device 1130 has occurred, an authenticated user 945 can be bound to the wireless device 1130. Once the authenticated user 945 has been bound to the wireless device 1130, the wireless device cloud management system allows the authenticated user to control the wireless device.

Figure 12:
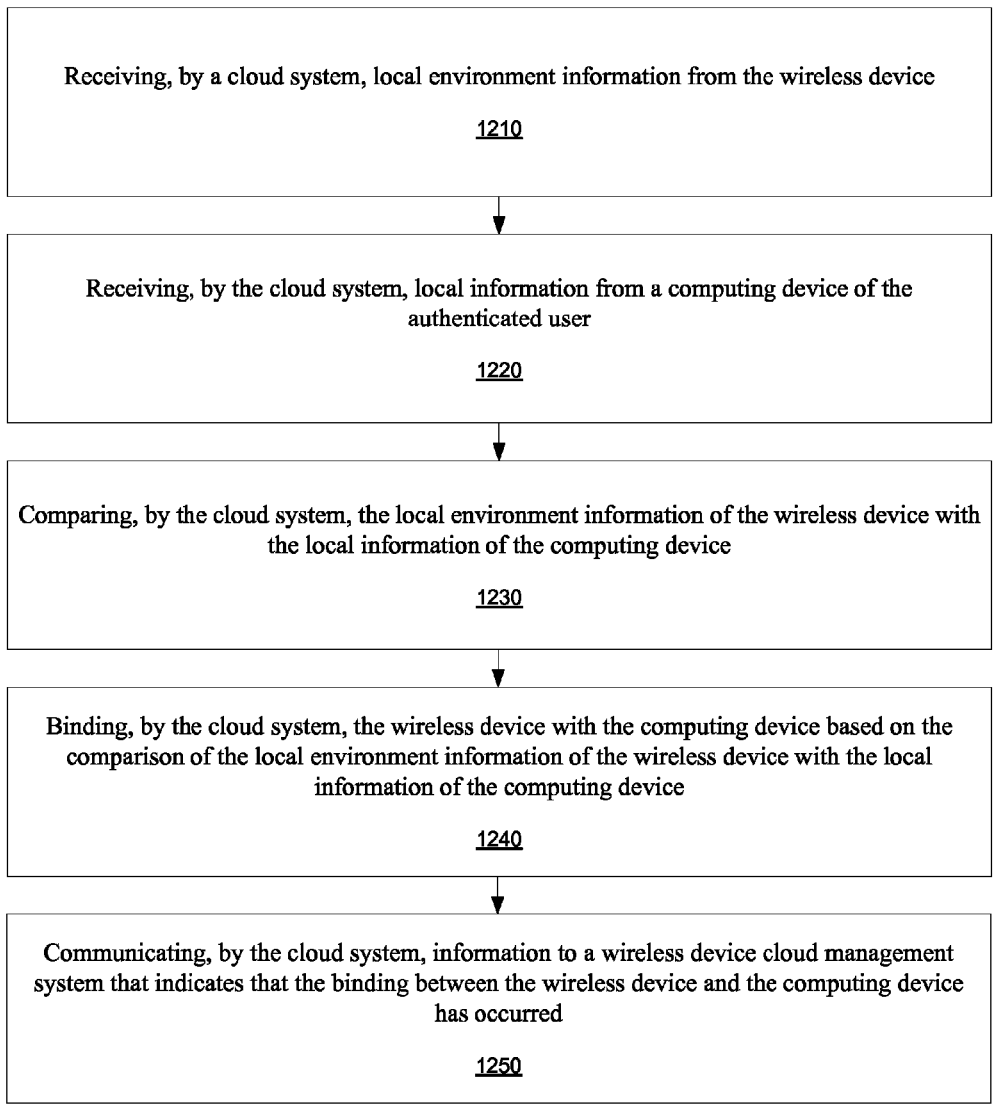
FIG. 12 is a flow chart that includes steps of an example of a method of binding an authenticated user with a wireless device, according to an embodiment.

FIG. 12 is a flow chart that includes steps of an example of a method of binding an authenticated user with a wireless device, according to an embodiment. A first step 1210 includes receiving, by a cloud system, local environment information from the wireless device. A second step 1220 includes receiving, by the cloud system, local information from a computing device of the authenticated user. A third step 1230 includes comparing, by the cloud system, the local environment information of the wireless device with the local information of the computing device. A fourth step 1240 includes binding, by the cloud system, the wireless device with the computing device based on the comparison of the local environment information of the wireless device with the local information of the computing device. A fifth step 1250 includes communicating, by the cloud system, information to a wireless device cloud management system that indicates that the binding between the wireless device and the computing device has occurred.

As previously described, for various embodiments the location environments information includes one or more of WiFi scan, GPS, lat/long information, Bluetooth scan, router information (IP, MAC), sound signature, sensed image, etc. Further, as previously described, other local environment information can include, for example, a picture taken by either the wireless device, or the computing device. For an embodiment, the picture includes an asset label of the wireless device or the computing device that includes an identifier of the wireless device or the computing device.

For at least some embodiments, the wireless device cloud management system allows the authenticated user to control the wireless device upon receiving the information that indicates that the binding between the wireless device and the computing device has occurred.

At least some embodiments further include preconfiguring the wireless device with credentials before the cloud system receives the local environment information from the device. At least some embodiments further include connecting the wireless device to a network of the cloud system. For at least some embodiments, connecting the wireless device to a network of the cloud system includes automatically requesting association, by the wireless device, to a router, receiving, by the cloud system, an authentication request from the router, wherein the router received the authentication request from the wireless device, returning, by the cloud system, a response to the authentication request to the router, wherein the response includes internet domains and connection bandwidths the wireless device is allowed to use, and preconfiguring the cloud system with the credentials that are also preconfigured in the wireless device.

At least some embodiments further include adaptively changing an environment local to the computing device, and the cloud system utilizing the adaptive change in the local environment of the computing device while comparing the local environment information of the wireless device with the local information of the computing device.

At least some embodiments further include adaptively changing an environment local to the wireless device, and the cloud system utilizing the adaptive change in the local environment of the wireless device while comparing the local environment information of the wireless device with the local information of the computing device.

For example, for an embodiment, the wireless device transmits a unique wireless signal, and the computing device senses that unique wireless signal to determine that the wireless device and the computing device are in proximity. As another example, for an embodiment, the computing device transmits an audio, and the wireless device receives that audio signal. The cloud system correlates the audio signal and the timing of the audio signal to determine that the wireless device and the computing device are in proximity. As another example, for an embodiment, the computing device gives instructions to a user to take an action (clapping hands, pressing a button, or turning on/off a switch, for example). The wireless device senses the action and reports that information back to the cloud service. The cloud service then correlates the signals to determine that the wireless device and the computing device are in proximity.

At least some embodiments, the local environment information from the wireless device includes at least localization information. For an embodiment, the localization information includes GPS information. For an embodiment, the localization information includes latitude, and/or longitude information. For an embodiment, the localization information includes a WiFi Scan—which can be used to estimate location.

At least some embodiments, the local environment information from the wireless device includes at least sensed information. (For at least some embodiments, the GPS and WiFi scan information could be considered sensed information as well. Other sensed information can be used instead of, or to supplement the localization information).

For at least some embodiments, comparing the local environment information of the wireless device with the local information of the computing device further comprises time correlating at least one of sensing or reporting of the local environment information of the wireless device and the local information of the computing device.

Additional Embodiments and Description

In many cases the internet service provider will only provide a low-bandwidth connection through this method, thereby requiring users to provide their own username and password for devices that require either local connectivity to other devices in the home or to devices requiring substantial bandwidth.

For example, a device that requires local connectivity to other devices in the home could be a light switch. A manufacturer may decide that local communication is necessary to provide a fast response time between the switch and the bulb, so the round trip through a cloud service is not acceptable and the switches and bulbs will require credentials to the local WiFi network.

Another example is a TV. The bandwidth required for streaming video is beyond what a manufacturer will typically pay for with the federated device cloud previously disclosed (which is often limited to less than 10 kbps). In this case the TV needs access to the local network.

In the case of the light switch and bulb, and in the case of the TV, the devices need access to the local network but don't have convenient user interfaces like keyboards. That is where the Secure Credential Distribution for Connected Products is most useful.

For at least some embodiments, a system-level implementation consists includes:
1. A Device that is to be connected to a wireless network
2. A side channel of communication for that Connected Device, that may be on the same physical frequency or physical chip, but is limited in some way. It may also be through a physically different network (for example, it could be waiting for ZigBee joining credentials on a Wi-Fi network)
3. A cloud-based Server that the device is pointed to for Secure Credential Distribution
4. A 3rd party Controller that will inject the local user credentials The system can be used, for example, in the following way:
1. A user installs a new TV (the Connected Device) in a house
2. The TV uses the Federated Device Cloud connection through the Access Point to get a low-bandwidth connection to a specific set of web addresses. In this case one of the web addresses is for the Secure Credential Distribution service.
3. The user uses an app provided by the internet service provider to look for new devices attached to the access point
4. The App checks with the Secure Credential Distribution Service to see what unprovisioned devices are connected to the users Access Point. The App shows that the TV is a new device that is not yet provisioned, but is connected to the Secure Credential Distribution server
5. The user selects the TV on the app, and clicks a button to allow the App to distribute the local WiFi network credentials.
6. The App then sends the WiFi credentials to the Secure Credential Distribution server
7. The Secure Credential Distribution server then sends the WiFi credentials to the device
8. The device then uses the credentials to join the local network Another use case is for customer support representatives:
1. A user installs a new TV (the Connected Device) in a house
2. The TV uses the Federated Device Cloud connection through the Access Point to get a low-bandwidth connection to a specific set of web addresses. In this case one of the web addresses is for the Secure Credential Distribution service.
3. The users tries to enter the password, but the TV does not connect to the local WiFi network
4. The user calls the Internet Service Provider or the Manufacturer customer support line
5. The Customer Service Representative (CSR) checks with the Secure Credential Distribution Service to see what unprovisioned devices are connected to the users Access Point. The CSR sees that the TV is a new device that is not yet provisioned, but is connected to the Secure Credential Distribution server
6. The CSR requests from the user permission to distribute the WiFi credential to the device. The user agrees.
7. The CSR then sends the WiFi credentials to the Secure Credential Distribution server
8. The Secure Credential Distribution server then sends the WiFi credentials to the device
9. The device then uses the credentials to join the local network The described embodiments include a number of security elements layered over the top for additional protection of the users WiFi credentials:

When sent from the Internet Service Provider or the App, the WiFi credentials can be encrypted using a one-time token or a key that is specific to the Secure Credential Distribution server.

When sent from the Secure Credential Distribution server to the Connected Device, the WiFi credentials can be encrypted with a one-time token or a key that is specific to the Secure Credential Distribution Server or specific to the Connected Device.

A company can use the Secure Credential Distribution Server to securely distribute credentials to a number of devices in a single home. For example, if a company is making both light bulbs and light switches, the company can use the Secure Credential Distribution service to get the WiFi credentials securely from the light switch to the light bulb. This can ensure the credentials are not leaked to outsiders.

The described embodiments include other elements to ensure the security of the device:

The device may be required to include a secure element to store the WiFi credentials, and this secure element may not allow the WiFi credentials to be shared with other devices or extracted from the device The use case described here is focused on WiFi, but this could also apply to other wired or wireless networks.

The described embodiments include unique innovation in two categories: the device and the server.

At least some embodiments include combinations of known capabilities into a unique combination. The device uses cryptographic authentication to verify the server is authorized to inject credentials into the device, and the server optionally uses cryptographic authentication to verify that the device is authorized to receive the credentials. The device then periodically uses a keep alive message to maintain the network connection to the verified server and waits for network credentials. The device then is able to securely receive the network credentials from the server once the credentials have been given to the server by the controller.

For at least some embodiments, a server uses cryptographic authentication to authenticate itself to the device, and also optionally uses cryptographic authentication to authenticate the device itself. The server then uses a cloud-based interface to await commands from a list of approved credential distribution controllers. The server may use cryptographic authentication to authenticate itself to the controller and to authenticate the controller. The server takes the credentials asserted by the controller and distributes them to the device. In this case the controller does not necessarily need to authenticate the device, and the device does not need to authenticate the controller, because the server is trusted by both. The distribution of the credentials can be encrypted and signed by the controller, then decrypted and re-encrypted and re-signed by the server—again, eliminating the need for the device to have any information about the controller and vice versa.

Although specific embodiments have been described and illustrated, the embodiments are not to be limited to the specific forms or arrangements of parts so described and illustrated.

What is claimed:

1. A computer-implemented method for securing credential distribution, comprising:
   receiving, by a cloud system, an initial notification from a credential management system that a wireless device is associated with an authenticated user of the credential management system, wherein the credential management system stores initial private network credentials of the authenticated user, and wherein the cloud system further receives an identifier of the wireless device with the initial notification;
   receiving, by the cloud system, the initial private network credentials of the authenticated user;
   storing, by the cloud system, the initial private network credentials and the identifier of the wireless device;
   receiving, by the cloud system, an authentication request from a router, wherein the router received the authentication request from the wireless device, wherein the authentication request was automatically requested by the wireless device, wherein the wireless device is preconfigured with device credentials;
   returning, by the cloud system, a response to the authentication request to the router, wherein the response includes internet domains and connection bandwidths the wireless device is allowed to use;
   authenticating the wireless device, by the cloud system, wherein authenticating ensures that the wireless device is authorized to receive the initial private network credentials; and
   distributing, by the cloud system, the initial private network credentials to the wireless device, thereby allowing the wireless device to obtain local network access with the initial private network credentials;
   receiving, by the cloud system, an invalidity notification from the wireless device that the initial private network credentials are invalid;
   requesting, by the cloud system, new private network credentials from the credential management system;
   receiving, by the cloud system, the new private network credentials from the credential management system; and
   distributing, by the cloud system, the new private network credentials to the wireless device.

2. The computer-implemented method of claim 1, wherein the initial private network credentials are encrypted.

3. The computer-implemented method of claim 1, wherein the wireless device includes an application granting to the credential management system, authority to distribute the initial private network credentials of the authenticated user to the cloud system.

4. The computer-implemented method of claim 1, further comprising the cloud system receiving a grant from the wireless device that includes an application of the wireless device granting to the cloud system, authority to receive and distribute the initial private network credentials of the authorized user.

5. A cloud system, comprising a plurality of servers, wherein at least one of the plurality of servers is operative to:

receive an initial notification from a credential management system that a wireless device is associated with an authenticated user of the credential management system, wherein the credential management system stores initial private network credentials of the authenticated user, and wherein the cloud system further receives an identifier of the wireless device with the initial notification;

receive the initial private network credentials of the authenticated user;

store the initial private network credentials and the identifier of the wireless device;

receive an authentication request from a router, wherein the router received the authentication request from the wireless device, wherein the authentication request was automatically requested by the wireless device, wherein the wireless device is preconfigured with device credentials;

return a response to the authentication request to the router, wherein the response includes internet domains and connection bandwidths the wireless device is allowed to use;

authenticate the wireless device, wherein authenticating ensures that the wireless device is authorized to receive the initial private network credentials;

distribute the initial private network credentials to the wireless device, thereby allowing the wireless device to obtain local network access with the initial private network credentials;

receive an invalidity notification from the wireless device that the initial private network credentials are invalid;

request new private network credentials from the credential management system;

receive the new private network credentials from the credential management system; and distribute the new private network credentials to the wireless device.

6. The cloud system of claim 5, further comprising the credential management system receiving a grant from the wireless device that includes an application of the wireless device granting to the credential management system, authority to distribute the private network credentials of the authenticated user to the cloud system.

7. The cloud system of claim 5, further comprising the cloud system receiving a grant from a mobile device user of a mobile device that includes an application granting to the cloud system, authority to receive and distribute the private network credentials of the authenticated user.

8. A computer-implemented method for securing credential distribution, comprising:

receiving, by a cloud system, an initial notification from a credential management system that a wireless device is associated with an authenticated user of the credential management system, wherein the credential management system stores initial private network credentials of the authenticated user, and wherein the cloud system further receives an identifier of the wireless device with the initial notification;

receiving, by the cloud system, the initial private network credentials of the authenticated user;

storing, by the cloud system, the initial private network credentials and the identifier of the wireless device;

receiving, by the cloud system, an authentication request from a router, wherein the router received the authentication request from the wireless device, wherein the authentication request was automatically requested by the wireless device, wherein the wireless device is preconfigured with device credentials;

returning, by the cloud system, a response to the authentication request to the router, wherein the response includes internet domains and connection bandwidths the wireless device is allowed to use;

authenticating the wireless device, by the cloud system, wherein authenticating ensures that the wireless device is authorized to receive the initial private network credentials;

distributing, by the cloud system, the initial private network credentials to the wireless device, thereby allowing the wireless device to obtain local network access with the initial private network credentials;

receiving, by the cloud system, an invalidity notification from the credential management system that previously distributed private network credentials should be invalidated; and distributing, by the cloud system, the invalidity notification to the wireless device, indicating to the wireless device to remove the previously distributed private network credentials.

9. A cloud system, comprising a plurality of servers, wherein at least one of the plurality of servers is operative to:

receive an initial notification from a credential management system that a wireless device is associated with an authenticated user of the credential management system, wherein the credential management system stores initial private network credentials of the authenticated user, and wherein the cloud system further receives an identifier of the wireless device with the initial notification;

receive the initial private network credentials of the authenticated user;

store the initial private network credentials and the identifier of the wireless device;

receive an authentication request from a router, wherein the router received the authentication request from the wireless device, wherein the authentication request was automatically requested by the wireless device, wherein the wireless device is preconfigured with device credentials;

return a response to the authentication request to the router, wherein the response includes internet domains and connection bandwidths the wireless device is allowed to use;

authenticate the wireless device, wherein authenticating ensures that the wireless device is authorized to receive the initial private network credentials;

distribute the initial private network credentials to the wireless device, thereby allowing the wireless device to obtain local network access with the initial private network credentials;

receive an invalidity notification from the credential management system that previously distributed private network credentials should be invalidated; and distribute the invalidity notification to the wireless device, indicating to the wireless device to remove the previously distributed private network credentials.

10. A computer-implemented method for securing credential distribution, comprising:

receiving, by a cloud system, an initial notification from a credential management system that a wireless device is associated with an authenticated user of the credential management system, wherein the credential management system stores initial private network credentials of the authenticated user, and wherein the cloud system further receives an identifier of the wireless device with the initial notification;

receiving, by the cloud system the initial private network credentials of the authenticated user;

storing, by the cloud system, the initial private network credentials and the identifier of the wireless device;

communicating, by the cloud system, the initial private network credentials and the identifier of the wireless device;

authenticating the wireless device, by the cloud system, wherein authenticating ensures that the wireless device is authorized to receive the initial private network credentials;

distributing, by the cloud system, the initial private network credentials to the wireless device, thereby allowing the wireless device to obtain local network access with the initial private network credentials;

receiving, by the cloud system, an invalidity notification from the wireless device that the initial private network credentials are invalid;

requesting, by the cloud system, new private network credentials from the credential management system; and distributing, by the cloud system, the new private network credentials to the wireless device.

11. The computer-implemented method of claim 10, wherein the initial private network credentials are encrypted.

12. The computer-implemented method of claim 10, wherein the wireless device includes an application granting to the credential management system, approval to distribute the initial private network credentials of the authenticated user.

13. The computer-implemented method of claim 10, further comprising the cloud system receiving a grant from the wireless device that includes an application granting to the cloud system authority, to receive and distribute the initial private network credentials of the authenticated user.

14. A cloud system, comprising a plurality of servers, wherein at least one of the plurality of servers is operative to:

receive an initial notification from a credential management system that a wireless device is associated with an authenticated user of the credential management system, wherein the credential management system stores initial private network credentials of the authenticated user, and wherein the cloud system further receives an identifier of the wireless device with the initial notification;

receive the initial private network credentials of the authenticated user;

store the initial private network credentials and the identifier of the wireless device;

communicate with the wireless device through internet access provided by a public network;

authenticate the wireless device, wherein authenticating ensures that the wireless device is authorized to receive the initial private network credentials;

distribute the initial private network credentials to the wireless device, thereby allowing the wireless device to obtain local network access with the initial private network credentials;

receive an invalidity notification from the wireless device that the initial private network credentials are invalid;

request new private network credentials from the credential management system;

receive the new private network credentials from the credential management system; and distribute the new private network credentials to the wireless device.

15. The cloud system of claim 14, further comprising the cloud system receiving a grant from the wireless device that includes an application of the wireless device granting to the cloud system, authority to receive and distribute the private network credentials of the authenticated user.

16. A computer-implemented method for securing credential distribution, comprising:

receiving, by a cloud system, an initial notification from a credential management system that a wireless device is associated with an authenticated user of the credential management system, wherein the credential management system stores initial private network credentials of the authenticated user, and wherein the cloud system further receives an identifier of the wireless device with the initial notification;

receiving, by the cloud system, the initial private network credentials of the authenticated user;

storing, by the cloud system, the initial private network credentials and the identifier of the wireless device;

communicating, by the cloud system, with the wireless device through internet access provided by a public network;

authenticating the wireless device, by the cloud system, wherein authenticating ensures that the wireless device is authorized to receive private network credentials;

distributing, by the cloud system, the initial private network credentials to the wireless device, thereby allowing the wireless device to obtain local network access with the initial private network credentials;

receiving, by the cloud system, an invalidity notification from the credential management system that previously distributed private network credentials should be invalidated; and distributing, by the cloud system, the invalidity notification to the wireless device, indicating to the wireless device to remove the previously distributed private network credentials.

17. A cloud system, comprising a plurality of servers, wherein at least one of the plurality of servers is operative to:

receive an initial notification from a credential management system that a wireless device is associated with an authenticated user of the credential management system, wherein the credential management system stores initial private network credentials of the authenticated user, and wherein the cloud system further receives an identifier of the wireless device with the initial notification;

receive the initial private network credentials of the authenticated user;

store the initial private network credentials and the identifier of the wireless device;

communicate with the wireless device through internet access provided by a public network;

authenticate the wireless device, wherein authenticating ensures that the wireless device is authorized to receive the initial private network credentials;

distribute the initial private network credentials to the wireless device, thereby allowing the wireless device to obtain local network access with the initial private network credentials;

receive an invalidity notification from the credential management system that previously distributed private network credentials should be invalidated; and distribute the invalidity notification to the wireless device, indicating to the wireless device to remove the previously distributed private network credentials.

\* \* \* \* \*